United States Patent
Sekiguchi et al.

(10) Patent No.: US 9,887,662 B2
(45) Date of Patent: Feb. 6, 2018

(54) MOTOR CONTROL DEVICE

(71) Applicant: Mitsubishi Electric Corporation, Chiyoda-ku (JP)

(72) Inventors: Hiroyuki Sekiguchi, Chiyoda-ku (JP); Hidetoshi Ikeda, Chiyoda-ku (JP); Shinya Murakoshi, Chiyoda-ku (JP); Kazuya Inazuma, Chiyoda-ku (JP); Takashi Isoda, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/300,054

(22) PCT Filed: Mar. 20, 2015

(86) PCT No.: PCT/JP2015/058504
§ 371 (c)(1),
(2) Date: Sep. 28, 2016

(87) PCT Pub. No.: WO2015/163063
PCT Pub. Date: Oct. 29, 2015

(65) Prior Publication Data
US 2017/0179869 A1    Jun. 22, 2017

(30) Foreign Application Priority Data

Apr. 22, 2014 (JP) ................. 2014-088562

(51) Int. Cl.
G05B 5/00 (2006.01)
H02P 29/60 (2016.01)

(52) U.S. Cl.
CPC .................. H02P 29/60 (2016.02)

(58) Field of Classification Search
CPC .......... H02P 29/60; G05B 2219/37429; G05B 2219/41127; G05B 2219/41154
See application file for complete search history.

(56) References Cited

U.S. PATENT DOCUMENTS

| | | | | |
|---|---|---|---|---|
| 6,256,570 | B1 * | 7/2001 | Weiberle | B60T 7/042 |
| | | | | 188/170 |
| 2007/0007927 | A1 | 1/2007 | Terada et al. | |
| 2014/0197770 | A1 | 7/2014 | Shimoda et al. | |

FOREIGN PATENT DOCUMENTS

| | | |
|---|---|---|
| JP | 59-106889 A | 6/1984 |
| JP | 5-015186 A | 1/1993 |

(Continued)

OTHER PUBLICATIONS

International Search Report dated Jun. 16, 2015 in PCT/JP2015/058504.

(Continued)

*Primary Examiner* — Karen Masih
(74) *Attorney, Agent, or Firm* — Oblon, McClelland, Maier & Neustadt, L.L.P.

(57) ABSTRACT

A device including: a command-generator outputting a drive command signal to a drive unit; a detector outputting a position-detection signal of the drive unit; a drive-current detector outputting a drive-current detection value; a controller receiving the drive command and position-detection signals to generate a drive-force command signal, and supplying the drive current according to the drive-force command signal and the drive-current detection value; a friction-characteristics-estimator receiving a drive force signal and the position-detection signal to output a friction-characteristics estimate value; a temperature-information acquirer outputting a temperature information value; a friction modeling unit having a set reference friction model having temperature-dependent characteristics, and outputting reference friction characteristics based on the temperature information value; and a friction-variation analyzer (Continued)

outputting a friction variation value based on variation of the friction-characteristics estimate value from the reference friction characteristics.

15 Claims, 12 Drawing Sheets

(56) References Cited

FOREIGN PATENT DOCUMENTS

| | | |
|---|---|---|
| JP | 2004-20388 A | 1/2004 |
| JP | 2005-080450 A | 3/2005 |
| JP | 2009-068950 A | 4/2009 |
| JP | 2010-210801 A | 9/2010 |
| JP | 2012-51669 A | 3/2012 |
| JP | 2012-130160 A | 7/2012 |
| WO | WO 2006/011203 A1 | 2/2006 |
| WO | 2012/165011 A1 | 12/2012 |
| WO | WO 2014/048604 A1 | 4/2014 |

OTHER PUBLICATIONS

International Search Report dated Jun. 16, 2015 in PCT/JP2015/058504 filed Mar. 20, 2015.
Korean Office Action dated Sep. 20, 2017 in Patent Application No. 10-2016-7029039 (with partial English translation).

* cited by examiner

MOTOR CONTROL DEVICE

FIELD

The present invention relates to a motor control device.

BACKGROUND

Conventionally, in a mechanical device having a drive unit configured by a drive mechanism such as a motor and a linear guide, if the mechanical device is broken down because of abnormality occurring due to an end of life or damage of the drive unit, its production activity is forced to stop for a long time until repair of the drive unit is complete. Further, abnormality in a part of the device may cause a large load to other normal parts, thereby damaging the normal parts. In terms of such matters, there has been a demand to find abnormality due to the end of life or damage at an early stage so that the abnormal part can be repaired or replaced before the mechanical device is broken down.

For example, Patent Literature 1 discloses a machine diagnostic device that reads a torque command and a speed during drive of a motor for friction measurement of a machine and displays the read torque command and speed on a display screen. Patent Literature 1 also describes to store the torque command and a motor position at the time of an initial operation and display the torque command and the motor position after passage of a predetermined time simultaneously. For example, Patent Literature 2 discloses a technique in a paper transport mechanism of an image forming apparatus, that determines degradation of the transport mechanism based on information of a paper transport time. In the technique, a time-degradation determination unit for determining degradation corrects the transport time acquired from information on a paper thickness and temperature or humidity under an installation environment.

CITATION LIST

Patent Literatures

Patent Literature 1: Japanese Patent Application Laid-open No. 2009-68950
Patent Literature 2: Japanese Patent Application Laid-open No. 2010-210801

SUMMARY

Technical Problem

However, in the conventional technique described in Patent Literature 1 listed above, a friction change associated with a temperature change is not taken into consideration. For this reason, there is a problem that, even if friction variation occurs, it is not possible to determine whether it is due to abnormality of a movable unit or due to a temperature change.

In the conventional technique described in Patent Literature 2 listed above, correction is performed according to the temperature under the installation environment, but it addresses only a limited operation of paper transport, and thereby degradation of the mechanism is determined based on the paper transport time. For this reason, there has been a problem that the technique cannot be applied to a motor control device in a general use application that requires movements in multiple directions and has various movement patterns.

The present invention has been made in view of the above circumstances, and an object of the present invention is to provide a motor control device that can be applied even if there are various movement patterns, and can exclude friction variation associated with a temperature change and extract friction variation due to abnormality of a movable unit.

Solution to Problem

In order to solve the above-mentioned problems and achieve the object, the present invention provides a motor control device comprising: a command generation unit that outputs a drive command signal as a command to a drive unit including a drive mechanism driven by a motor; a movement detection unit that detects a position or speed of the drive unit and outputs a movement detection signal; a drive-current detection unit that detects a drive current supplied to the motor and outputs a drive-current detection value; a control unit that receives the drive command signal and the movement detection signal as inputs to generate a drive-force command signal, and supplies the drive current according to the drive-force command signal and the drive-current detection value; a friction-characteristics estimation unit that receives a drive force signal representing a drive force of the motor and the movement detection signal as inputs to output a friction-characteristics estimate value; a temperature-information acquisition unit that acquires a temperature of the drive unit or a temperature of a part whose temperature changes according to the temperature of the drive unit and outputs a temperature information value; a friction modeling unit in which a reference friction model whose characteristics change according to the temperature of the drive unit or the temperature of the part whose temperature changes according to the temperature of the drive unit is set, which outputs reference friction characteristics based on the temperature information value; and a friction-variation analysis unit that outputs a friction variation value based on variation of the friction-characteristics estimate value with respect to the reference friction characteristics.

Advantageous Effects of Invention

According to the present invention, it is possible to provide a motor control device that can be applied even if there are various movement patterns, and can exclude friction variation associated with a temperature change and extract friction variation due to abnormality of a movable unit.

DESCRIPTION OF EMBODIMENTS

Motor control device according to embodiments of the present invention will be described below in detail with reference to the drawings. The present invention is not limited to these embodiments.

First Embodiment

Figure 1:
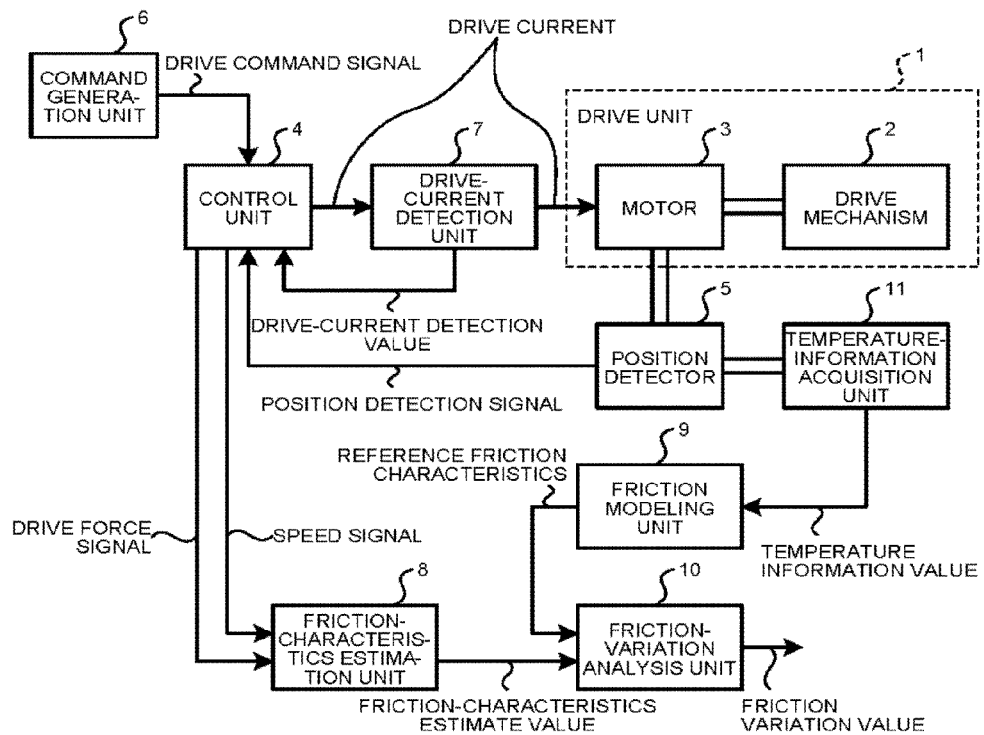
FIG. 1 is a block diagram illustrating a configuration of a motor control device according to a first embodiment.

FIG. 1 is a block diagram illustrating a configuration of a motor control device according to a first embodiment of the present invention. The motor control device illustrated in FIG. 1 includes a drive unit 1, a control unit 4, a position detector 5, a command generation unit 6, a drive-current detection unit 7, a friction-characteristics estimation unit 8, a friction modeling unit 9, a friction-variation analysis unit 10 and a temperature-information acquisition unit 11. The drive unit 1 includes a drive mechanism 2 and a motor 3 which are represented by a linear guide. The motor 3 generates a drive force according to a drive current supplied from the control unit 4 via the drive-current detection unit 7 and drives the drive mechanism 2. The position detector 5 attached to the motor 3 detects a position of the motor 3 and outputs a position detection signal. The command generation unit 6 is set so that the drive unit 1 performs a desired operation and generates and outputs a drive command signal that is an operation command signal, according to the setting. The drive-current detection unit 7 detects and outputs the drive current from the control unit 4. The control unit 4 outputs a speed signal based on the position detection signal and a drive force signal based on a drive-current detection value, while supplying the drive current to the motor 3, based on the position detection signal, the drive command signal and the drive-current detection value. The friction-characteristics estimation unit 8 estimates friction characteristics of the drive unit 1 based on the speed signal and the drive force signal from the control unit 4 and outputs a friction-characteristics estimate value. The temperature-information acquisition unit 11 measures a temperature of the position detector 5 and outputs a temperature information value to the friction modeling unit 9. In the friction modeling unit 9, a temperature dependence of friction is modeled, and a reference friction model that is a temperature friction model whose characteristics change according to the temperature is set. The friction modeling unit 9 outputs reference friction characteristics as friction characteristics of the temperature friction model at the temperature information value. The friction-variation analysis unit 10 performs a calculation based on the variation amount of the friction-characteristics estimate value with respect to the reference friction characteristics, and outputs a friction variation value. It is only necessary, although not illustrated, to output the friction variation value to a display unit, for example, mounted on the motor control device, or an external display unit of the motor control device, so as to enable a user to recognize the friction variation value. However, the friction variation value may be recognizable by a user through an auditory sense by sound, for example, thus the friction variation value not being limited to a manner that the value is recognizable by the user through a visual sense.

Figure 2:
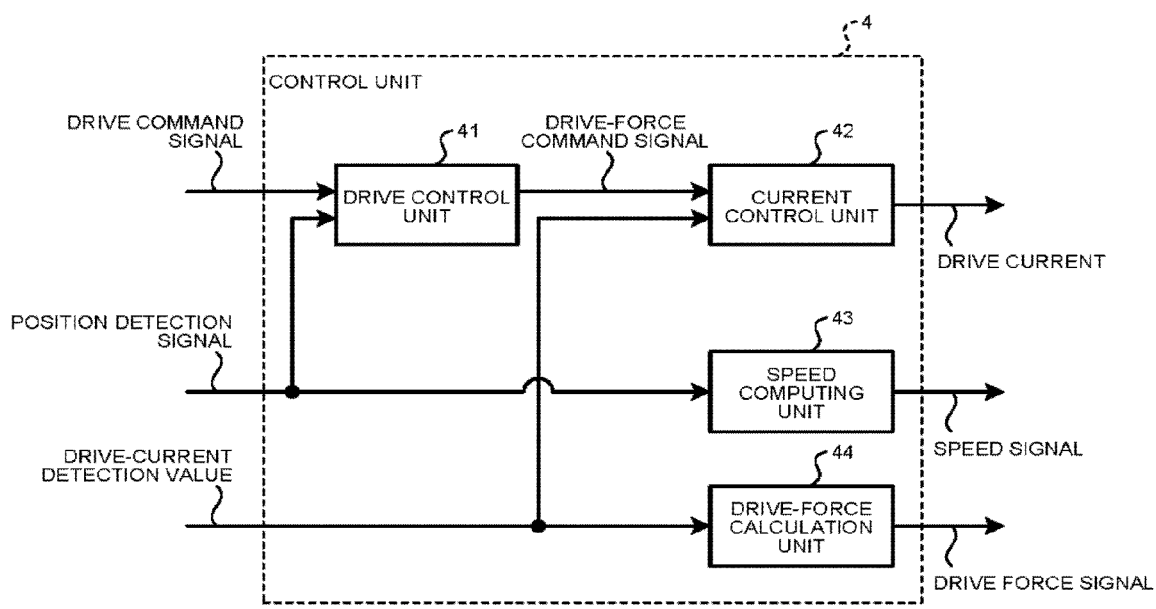
FIG. 2 is a block diagram illustrating a configuration of a control unit included in the motor control device according to the first embodiment.

FIG. 2 is a block diagram illustrating a configuration of the control unit 4 included in the motor control device illustrated in FIG. 1. The control unit 4 illustrated in FIG. 2 includes a drive control unit 41, a current control unit 42, a speed computing unit 43 and a drive-force calculation unit 44. The drive control unit 41 generates a drive-force command signal based on the drive command signal and the position detection signal and outputs the drive-force command signal to the current control unit 42. For the generation of the drive-force command signal, a proportional, integration or differential operation is used. The current control unit 42 outputs a drive current so that the drive force generated in the motor 3 follows the drive-force command signal, according to the drive-force command signal and the drive-current detection value. The speed computing unit 43 generates a speed signal based on the position detection signal and outputs the speed signal to the friction-characteristics estimation unit 8. For the generation of the speed signal, an operation based on differential or subtraction is used. The drive-force calculation unit 44 generates a drive force signal based on the drive-current detection value and outputs the drive force signal. By using the drive-current detection value, a drive force signal according to the drive force being generated in the motor 3 can be generated.

The drive mechanism 2 of the drive unit 1 is driven by the motor 3 mechanically coupled thereto. The drive mechanism 2 includes a movable unit represented by a ball screw that converts a rotary movement of the motor 3 to a linear movement or a guide mechanism that sets a moving direction, and friction is caused at the time of movement of the drive unit 1. The friction varies due to an influence of wear, flaw or foreign matters of the movable unit. Therefore, the friction characteristics are considered to be an index representing a state of the drive mechanism 2. Consequently, by comparing the normal friction characteristics at the time of introduction of the mechanical device or component replacement of the drive mechanism 2 with the current friction characteristics, a state of variation with time of the drive mechanism 2 can be ascertained. The current friction characteristics are outputted from the friction-characteristics estimation unit 8 as the friction-characteristics estimate value. The friction-characteristics estimation unit 8 estimates friction generated in the drive unit 1 from the drive force signal and the speed signal and outputs the friction-characteristics estimate value. The friction-characteristics estimate value includes two coefficients, that is, a viscosity coefficient and a Coulomb coefficient, and a relation between the friction and these coefficients is represented by the following expression (1).

[Expression 1]

$$(\text{Friction}) = (\text{viscosity coefficient}) \times (\text{speed}) + (\text{Coulomb coefficient}) \times (\text{speed direction}) \quad (1)$$

Furthermore, grease or lubricant is applied to the movable unit for lubrication and friction reduction. Because the viscosity of the grease or lubricant changes according to the temperature, the friction of the drive mechanism 2 has a temperature dependence.

Figure 3:
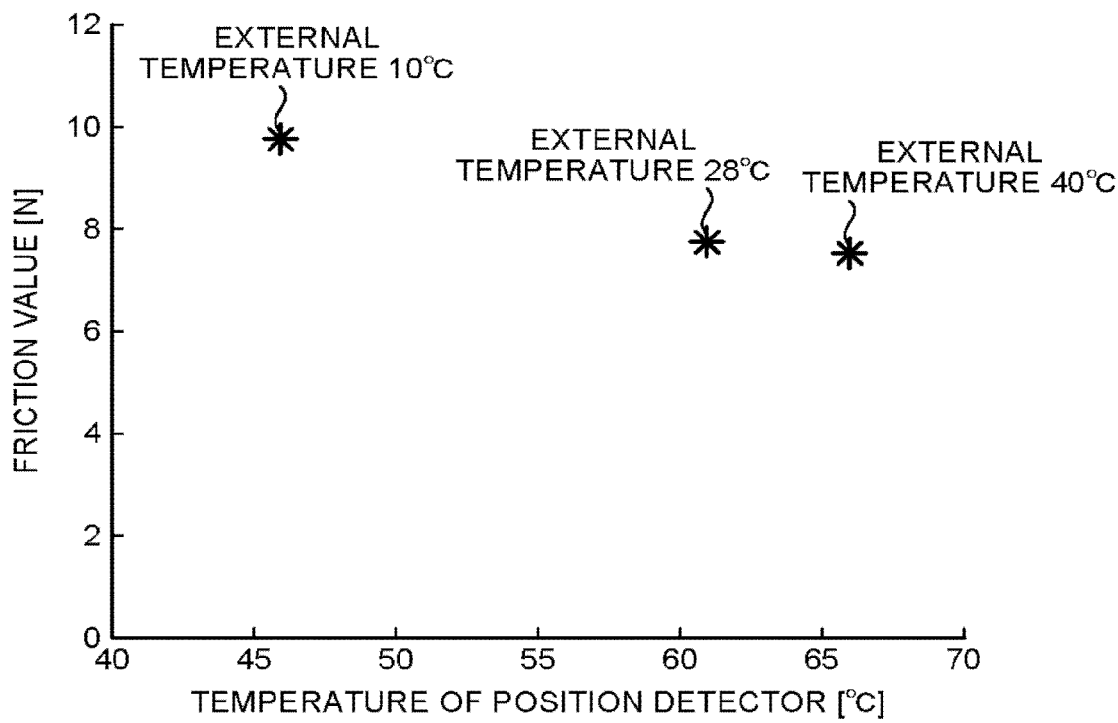
FIG. 3 is a graph illustrating a temperature dependence of a friction value when a drive mechanism configured by a ball screw is driven by a motor at a normal time, in the motor control device according to the first embodiment.

FIG. 3 is a graph illustrating a temperature dependence of a friction value when the drive mechanism 2 configured by a ball screw is driven by the motor 3, as an example, at the time of introduction of the mechanical device, at a normal time. Herein, the temperature (° C.) of the position detector 5 is plotted on a horizontal axis, while a friction value (N) when the motor 3 is rotated at a revolution speed of 3000 rpm (revolution per minute) is plotted on a vertical axis. Values plotted in FIG. 3 indicate a relation of a friction value to a temperature of the position detector 5 when the external temperature is 10° C., 28° C. or 40° C. As illustrated in FIG. 3, as the temperature of the position detector 5 or the external temperature increases, the friction decreases.

The position detector 5 is mechanically connected to the drive mechanism 2 via the motor 3. However, because the temperature of the position detector 5 changes according to the temperature of the drive mechanism 2, the temperature of the position detector 5 can be used as the temperature related to the friction of the drive mechanism 2. The temperature-information acquisition unit 11 that measures the temperature of the position detector 5 is attached to the position detector 5, which is not a movable unit, and thus the temperature-information acquisition unit 11 can be easily attached thereto.

Now description is given for a case where variation with time is ascertained based on friction variation, using a friction value 7.7N acquired at the external temperature of 28° C. as a reference. Because the friction value estimated at the external temperature of 10° C. is 9.7N, the friction value is supposed to have varied by 2.0N at the external temperature of 28° C. The variation amount of the friction value is 26% in percentage. Therefore, if the temperature dependence is not taken into consideration, it is erroneously determined that the variation of 26% in friction is caused by the variation with time. Accordingly, the temperature dependence of friction should be taken into consideration when variation of the friction characteristics caused by the variation with time of the drive mechanism 2 is extracted from the friction variation. The temperature friction model obtained by modeling the temperature dependence of friction is set to the friction modeling unit 9 in order to extract the variation with time of the drive mechanism 2 from the current friction-characteristics estimate value estimated by taking the temperature dependence of friction into consideration. In the friction modeling unit 9, the reference friction characteristics corresponding to the temperature acquired by the temperature-information acquisition unit 11 are calculated.

Figure 4:
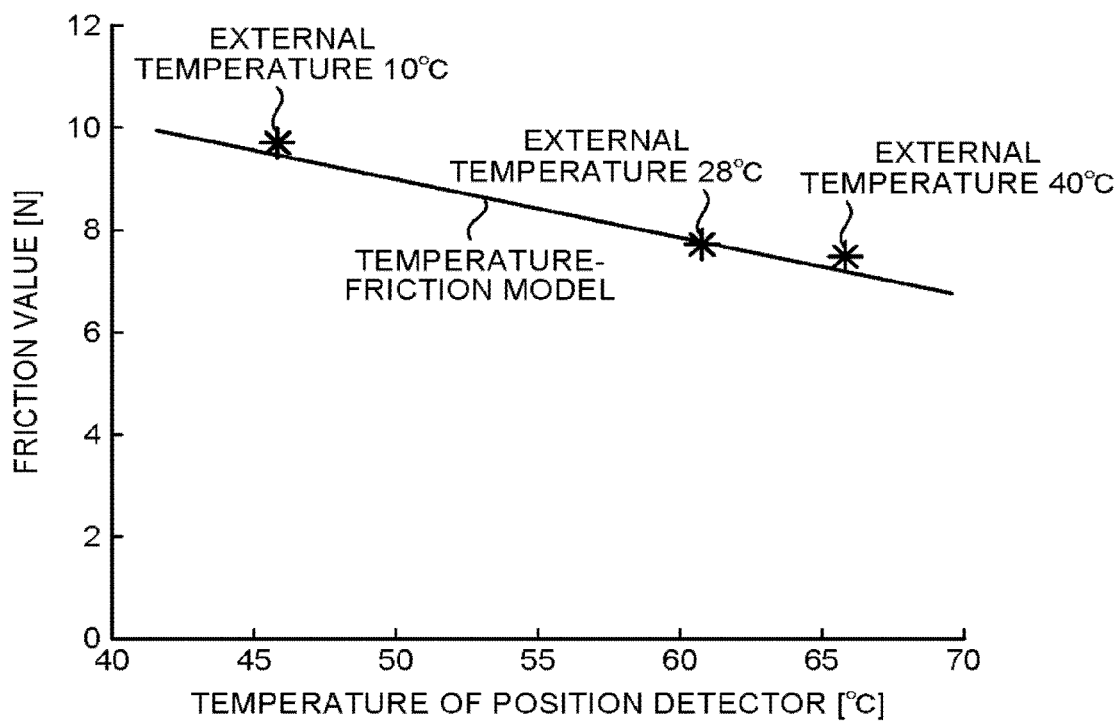
FIG. 4 is a graph illustrating a temperature dependence of a friction value, in which a temperature friction model is added to a friction value when a drive mechanism configured by a ball screw is driven by a motor at a normal time, in the motor control device according to the first embodiment.

FIG. 4 is a graph illustrating a temperature dependence of friction, in which the temperature friction model is added to FIG. 3. The graph illustrated in FIG. 4 indicates a friction value when the motor 3 is rotated at 3000 rpm, in the temperature friction model generated based on the temperature dependence of friction of the drive mechanism 2 in FIG. 3. When the external temperature is 10° C. and the motor 3 is rotated at the revolution speed of 3000 rpm, the estimated friction value is 9.7N, and the temperature of the position detector 5 acquired by the temperature-information acquisition unit 11 is 46° C. A friction value under the condition that the motor 3 is rotated at the revolution speed of 3000 rpm in the reference friction characteristics calculated from the temperature friction model at this temperature is 9.56N, and the friction variation is supposed to be 0.14N. The variation amount of the friction value is 1.5% in percentage. In this manner, the friction variation due to variation with time is 1.5%, and it can be determined that the variation with time has hardly occurred. That is, at a normal time, the reference friction characteristics at the temperature at which the friction characteristics are estimated can be acquired, as an example, from a temperature friction model based on the temperature dependence of friction of the drive mechanism 2 at the time of introduction of the mechanical device. By comparing the friction-characteristics estimate value with the reference friction characteristics to perform analysis, the variation with time of the drive mechanism 2 can be ascertained with taking the temperature dependence of friction into consideration.

The above description has been made for the friction value when the motor 3 is rotated at the revolution speed of 3000 rpm. The friction-characteristics estimate value, however, includes two coefficients, that is, the viscosity coefficient and the Coulomb coefficient, and the relation between the friction and these coefficients is represented by a function of a speed or revolution speed as in the above expression (1). By setting a temperature friction model corresponding to an expression of the friction-characteristics estimate value, comparison and analysis of the estimated friction-characteristics estimate value can be performed regardless of the speed of the motor 3. In the temperature friction model in that case, the viscosity coefficient and the Coulomb coefficient are set by expressions of a temperature dependence as shown in the following expressions (2) and (3).

[Expression 2]

$$(\text{Viscosity coefficient}) = (\text{viscosity temperature coefficient}) \times (\text{temperature}) + (\text{viscosity offset value}) \quad (2)$$

[Expression 3]

$$(\text{Coulomb coefficient}) = (\text{Coulomb temperature coefficient}) \times (\text{temperature}) + (\text{Coulomb offset value}) \quad (3)$$

At this time, the friction modeling unit 9 outputs the viscosity coefficient and the Coulomb coefficient, which are a reference, as the reference friction characteristics based on the above expressions (2) and (3) according to the input temperature information value.

In such a configuration, at a normal time, a temperature friction model whose characteristics change according to the temperature is set to the friction modeling unit 9 based on the temperature dependence of friction of the drive mechanism 2 at the time of introduction of the mechanical device as an example. Based on the temperature information value outputted by the temperature-information acquisition unit 11 at the time of estimation of the friction-characteristics estimate value, the friction modeling unit 9 calculates the reference friction characteristics that are the normal friction characteristics of the drive mechanism 2 at a temperature indicated by the temperature information value.

The friction-variation analysis unit 10 calculates a friction variation value representing friction variation of the drive mechanism 2 associated with variation with time, as described above, based on the reference friction characteristics and the friction-characteristics estimate value.

Figure 5:
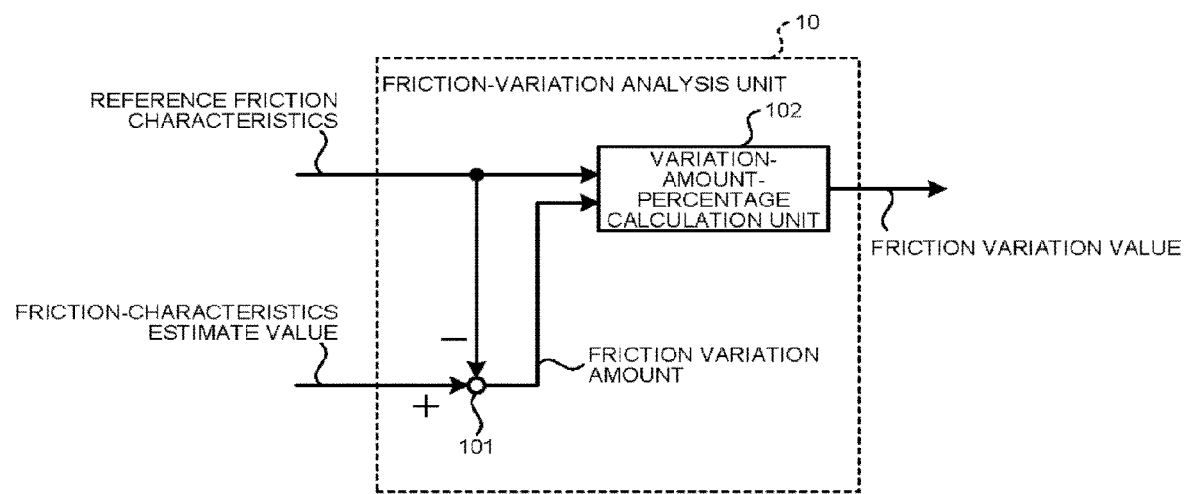
FIG. 5 is a diagram illustrating a configuration of a friction-variation analysis unit according to the first embodiment.

FIG. 5 is a diagram illustrating a configuration of the friction-variation analysis unit 10. The friction-variation analysis unit 10 illustrated in FIG. 5 includes a subtractor 101 and a variation-amount-percentage calculation unit 102. The subtractor 101 outputs a difference between the friction-characteristics estimate value and the reference friction characteristics as a friction variation amount. The variation-amount-percentage calculation unit 102 calculates a percentage of the friction variation amount with respect to the reference friction characteristics based on the reference friction characteristics and friction variation amount inputted thereto, and outputs the percentage as a friction variation value. In this way, the friction-variation analysis unit compares the friction-characteristics estimate value of the drive mechanism 2 estimated by the friction-characteristics estimation unit 8 with the reference friction characteristics calculated by the friction modeling unit 9, thereby enabling to output a friction variation value obtained with taking the temperature dependence of friction into consideration.

As described above, the motor control device according to the present embodiment can calculate the friction variation value representing variation with time of the drive mechanism 2 based on the estimated friction-characteristics estimate value, even under an installation environment in which the temperature changes.

In the present embodiment, the drive-force calculation unit 44 of the control unit 4 generates a drive force signal based on a drive-current detection value. However, the drive force signal may also be generated using a drive-force command signal generated by the drive control unit 41 of the control unit 4, instead of the drive-current detection value. Further, the drive force signal may be generated using a signal acquired from a sensor that measures a drive force of the motor 3, represented by a torque meter.

Furthermore, a position and temperature detector having a temperature measuring function for correcting a detection value may be used instead of the position detector 5 and the temperature-information acquisition unit 11, and the position and temperature detector may serve as the position detector 5 and the temperature-information acquisition unit 11. According to this configuration, the temperature-information acquisition unit 11 does not need to be installed, and the same transmission cable can be shared as a transmission cable for the temperature information value and a transmission cable for the position detection value, thereby enabling to reduce the cost.

In the present embodiment, a temperature measuring location of the temperature-information acquisition unit 11 is set as the position detector 5. However, the present invention is not limited thereto, and the temperature-information acquisition unit 11 may measure a temperature of the drive mechanism 2 or the motor 3 instead of the temperature of the position detector 5. When the temperature of the drive mechanism 2 is measured, the temperature dependence of friction of the drive mechanism 2 can be modeled more accurately than the present embodiment described above.

In the present embodiment, a position to be detected by the position detector 5 is set as a position of the motor 3. However, the present invention is not limited thereto, and the position detector 5 may detect a position of the drive mechanism 2. In this case, the control unit 4 only needs to calculate the speed signal based on the position detection signal corresponding to the position of the drive mechanism 2.

Alternatively, instead of the position detector 5, a speed detector that detects a speed of the motor 3 or the drive mechanism 2 may be used. When the speed detector is used instead of the position detector 5, it is sufficient to calculate the position using a speed detection signal representing the speed detected by the speed detector, for example, by calculation based on integration operation. The position detector and the speed detector are collectively referred to as "movement detection unit". The speed detection signal and the position detection signal are collectively referred to as "movement detection signal".

Second Embodiment

Figure 6:
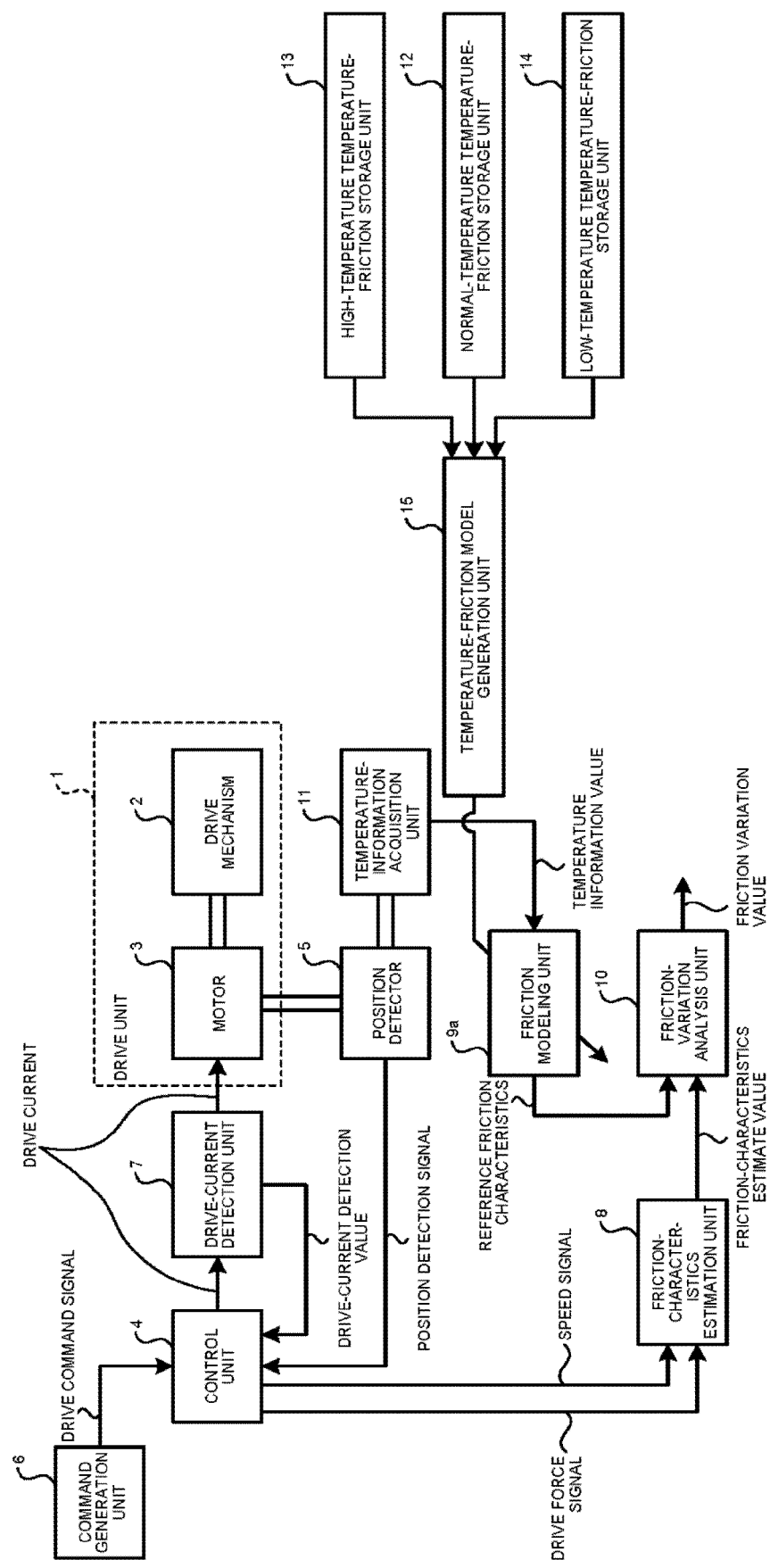
FIG. 6 is a block diagram illustrating a configuration of a motor control device according to a second embodiment.

FIG. 6 is a block diagram illustrating a configuration of a motor control device according to a second embodiment of the present invention. The motor control device of the present embodiment has a configuration in which a normal-temperature temperature-friction storage unit 12, a high-temperature temperature-friction storage unit 13, a low-temperature temperature-friction storage unit 14 and a temperature-friction model generation unit 15 are added to the configuration of FIG. 1, and a friction modeling unit 9a is provided instead of the friction modeling unit 9. A temperature information value and friction characteristics are set to the normal-temperature temperature-friction storage unit 12, the high-temperature temperature-friction storage unit 13 and the low-temperature temperature-friction storage unit 14. The temperature-friction model generation unit 15 generates a temperature friction model based on the temperature information value and the friction characteristics set to the normal-temperature temperature-friction storage unit 12, the high-temperature temperature-friction storage unit 13 and the low-temperature temperature-friction storage unit 14. In the motor control device illustrated in FIG. 6, constituent elements identical to those illustrated in FIG. 1 operate and function in the same manner, and thus descriptions thereof are omitted here.

In the motor control device illustrated in FIG. 6, the temperature-friction model generation unit 15 first generates a temperature friction model, based on the temperature information value and the friction characteristics in the drive mechanism 2 at a normal time under different external temperature conditions, as an example, at the time of introduction of the mechanical device, by a method of obtaining an approximate curve represented by a least-square method, that is, by an approximate calculation. Temperature information values and friction characteristics under different external temperature conditions are set to the normal-temperature temperature-friction storage unit 12, the high-temperature temperature-friction storage unit 13 and the low-temperature temperature-friction storage unit 14. As an example of respective settings of the normal-temperature temperature-friction storage unit 12, the high-temperature temperature-friction storage unit 13 and the low-temperature temperature-friction storage unit 14, what can be mentioned is setting of the temperature information values acquired by the temperature-information acquisition unit 11 and the friction-characteristics estimate value estimated by the friction-characteristics estimation unit 8 in respective cases where the external temperature is 28° C. as a normal temperature, 10° C. as a low temperature, and 40° C. as a high temperature as illustrated in FIG. 3. The temperature-friction model generation unit 15 generates a temperature friction model based on the temperature information values and the friction characteristics set as described above, by the method of obtaining an approximate curve, that is, the approximate calculation, represented by the least-square method and outputs the temperature friction model to the friction modeling unit 9a. According to such a configuration, the drive unit 1 is operated under different temperature environments using, for example, a constant temperature room, to acquire the temperature information values and the friction characteristics, and the acquired ones are set to the normal-temperature temperature-friction storage unit 12, the high-temperature temperature-friction storage unit 13 and the low-temperature temperature-friction storage unit 14. Accordingly, the temperature-friction model generation unit generates a temperature friction model and automatically outputs the generated temperature friction model to the friction modeling unit 9a, and the temperature friction model is automatically set to the friction modeling unit 9a.

As described above, in the motor control device according to the present embodiment, by setting the temperature information values and the friction characteristics acquired by operating the drive unit 1 under the different temperature environments, the friction variation value representing variation with time of the drive mechanism 2 can be calculated based on the estimated friction characteristics, even under the installation environment in which the temperature changes.

The motor control device according to the present embodiment includes three temperature-friction storage units. However, the present invention is not limited thereto, and as an example, there may be provided two temperature-friction storage units, that is, a normal-temperature temperature-friction storage unit and a high-temperature temperature-friction storage unit. Alternatively, as another example, there may be provided four or more temperature-friction storage units including first and second normal-temperature temperature-friction storage units, a high-temperature temperature-friction storage unit and a low-temperature temperature-friction storage unit. The temperature-friction model generation unit 15 can generate the temperature friction model, so long as at least two temperature-friction storage units are provided.

Third Embodiment

Figure 7:
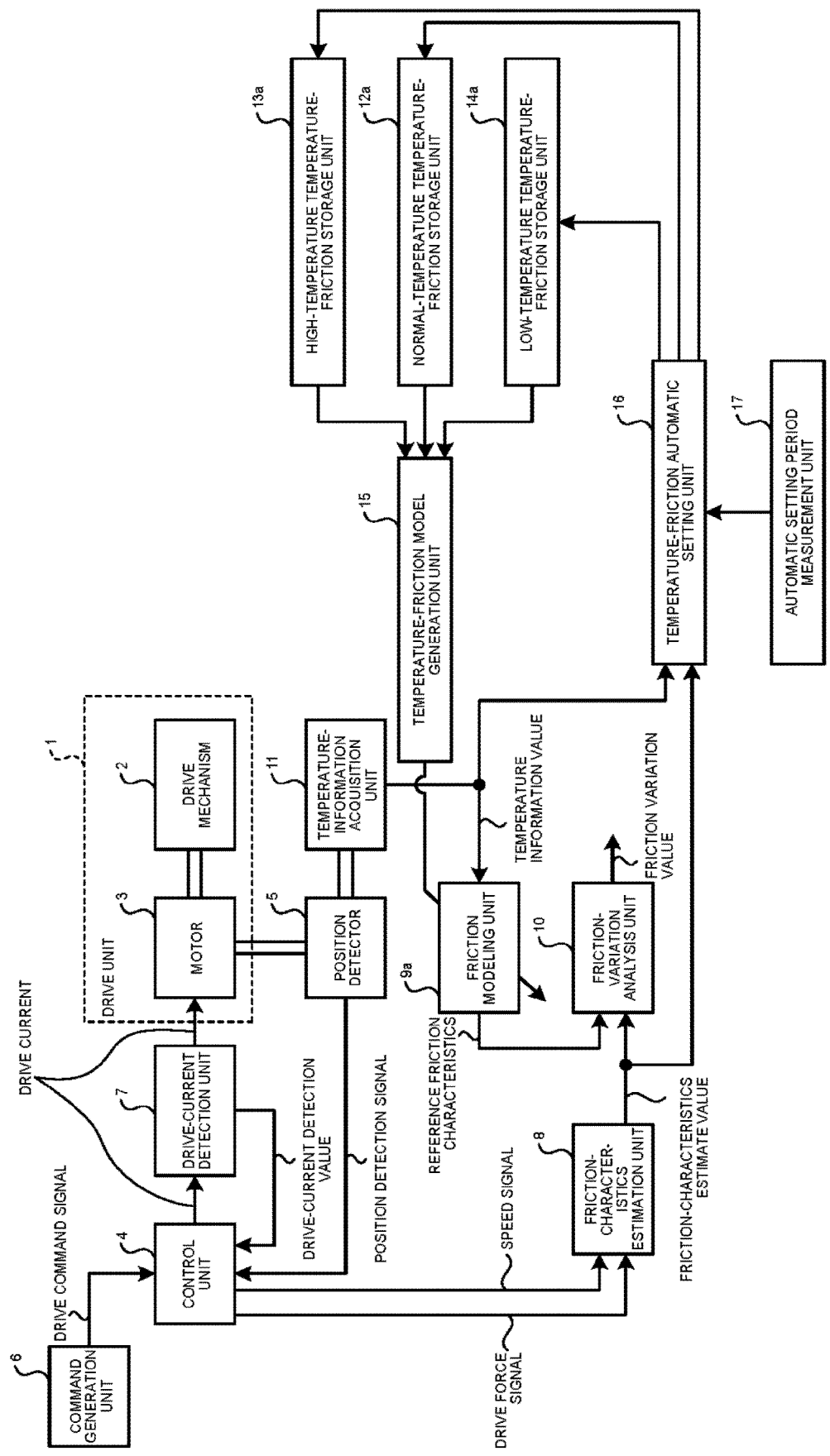
FIG. 7 is a block diagram illustrating a configuration of a motor control device according to a third embodiment.

FIG. 7 is a block diagram illustrating a configuration of a motor control device according to a third embodiment of the present invention. The motor control device according to the present embodiment has a configuration in which a temperature-friction automatic setting unit 16 and an automatic setting period measurement unit 17 that measures a period automatically set are added to the configuration illustrated in FIG. 6, and a normal-temperature temperature-friction storage unit 12a is provided instead of the normal-temperature temperature-friction storage unit 12, a high-temperature temperature-friction storage unit 13a is provided instead of the high-temperature temperature-friction storage unit 13, and a low-temperature temperature-friction storage unit 14a is provided instead of the low-temperature temperature-friction storage unit 14. The temperature-friction automatic setting unit 16 sets a temperature information value and a friction-characteristics estimate value to the normal-temperature temperature-friction storage unit 12a, the high-temperature temperature-friction storage unit 13a and the low-temperature temperature-friction storage unit 14a, in the period automatically set. The automatic setting period measurement unit 17 maintains an automatic setting period, and outputs an automatic-setting request signal to the temperature-friction automatic setting unit 16 within the period automatically set. In a period in which the automatic-setting request signal is being inputted, the temperature-friction automatic setting unit 16 continues to perform automatic setting for the normal-temperature temperature-friction storage unit 12a, the high-temperature temperature-friction storage unit 13a and the low-temperature temperature-friction storage unit 14a. In the motor control device illustrated in FIG. 7, constituent elements identical to those illustrated in FIGS. 1 and 6 operate and function in the same manner, except for the temperature-friction model generation unit 15, and thus descriptions thereof are omitted here. The temperature-friction model generation unit 15 has the same configuration as those illustrated in FIGS. 1 and 6, but operates differently. If the period set by the automatic setting period measurement unit 17 is a long period such as a year or more, the drive mechanism 2 has a risk of undergoing variation with time during the period. Therefore, the period automatically set is preferably a period from about three months to six months, that is a period in which it is supposed that the variation with time hardly occurs.

In the motor control device illustrated in FIG. 7, the temperature-friction automatic setting unit 16 uses the fact that the external temperature changes according to a seasonal change in the environment where the drive unit 1 is installed, to set the temperature information value to the normal-temperature temperature-friction storage unit 12a, the high-temperature temperature-friction storage unit 13a and the low-temperature temperature-friction storage unit 14a, and automatically set the friction-characteristics estimate value. Since the temperature friction model is generated based on the temperature information values and the friction characteristics of the normal-temperature temperature-friction storage unit 12a, the high-temperature temperature-friction storage unit 13a and the low-temperature temperature-friction storage unit 14a, modeling can be performed more accurately when the temperature information value and the friction characteristics having a larger width of a temperature change are used. The temperature-friction automatic setting unit 16 uses an external temperature change according to the seasonal change. If the period automatically set becomes a long period such as a year or more, the drive mechanism 2 has a risk of undergoing variation with time during the period. Therefore, the period automatically set is preferably a period from about three months to six months, that is a period in which there is a change in the external temperature due to the seasonal change but it is supposed that the variation with time change hardly occurs.

Figure 8:
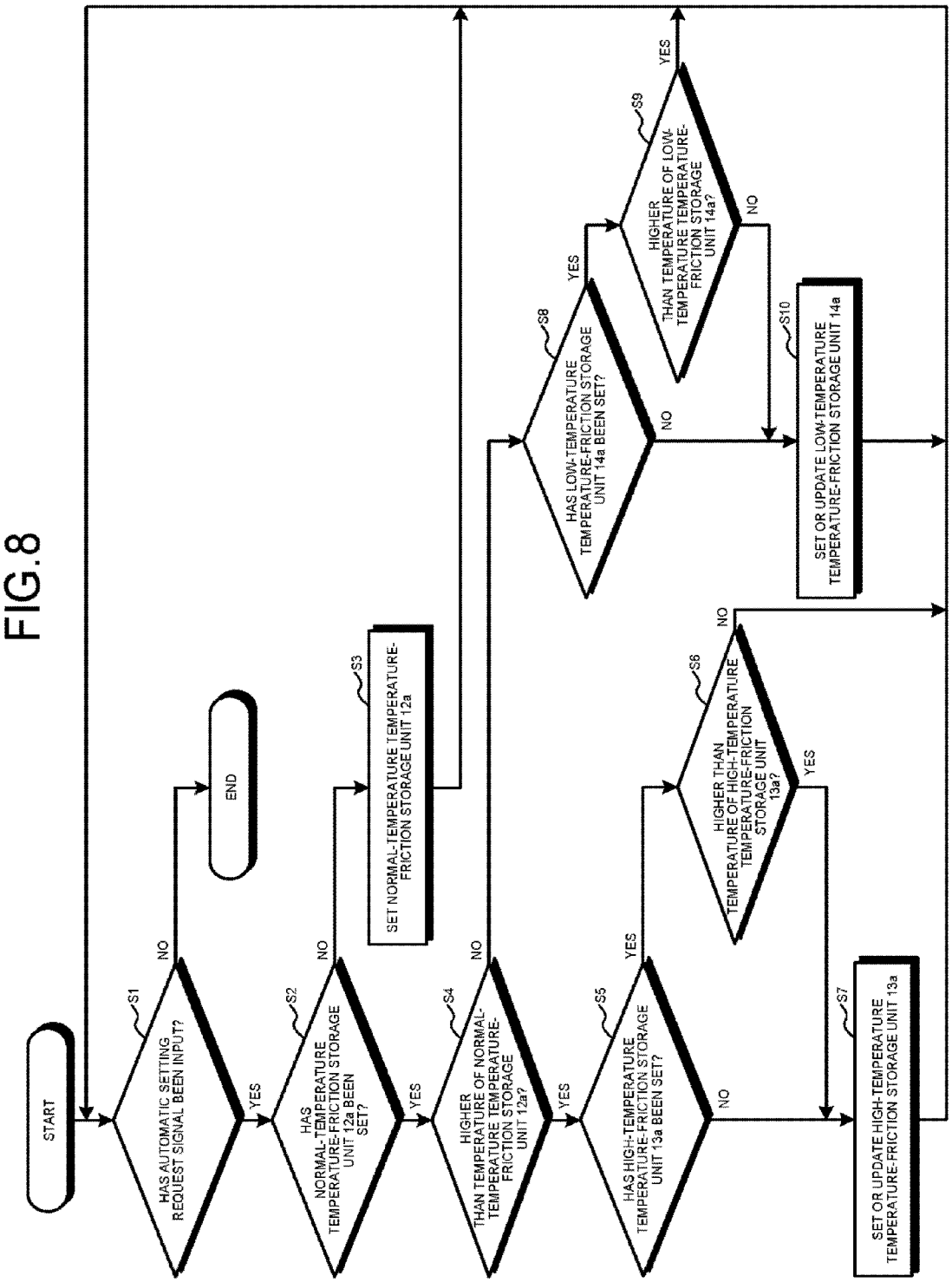
FIG. 8 is a flowchart illustrating an operation of setting a temperature information value and a friction-characteristics estimate value, which is performed by a temperature-friction automatic setting unit based on an automatic setting sequence, in the motor control device according to the third embodiment.

FIG. 8 is a flowchart illustrating an operation of setting the temperature information value and the friction-characteristics estimate value, which is performed by the temperature-friction automatic setting unit 16 according to an automatic setting sequence. The set temperature information value and friction-characteristics estimate value are set to the normal-temperature temperature-friction storage unit 12a, the high-temperature temperature-friction storage unit 13a and the low-temperature temperature-friction storage unit 14a. First, the temperature-friction automatic setting unit 16 starts an automatic setting operation, and determines whether or not the automatic-setting request signal has been inputted (Step S1). If the automatic-setting request signal has not been inputted (when determined as NO at Step S1), the temperature-friction automatic setting unit 16 ends the automatic setting. If the automatic-setting request signal has been inputted (when determined as YES at Step S1), the temperature-friction automatic setting unit 16 determines whether or not the temperature information value and the friction-characteristics estimate value have been set to the normal-temperature temperature-friction storage unit 12a (Step S2). If the temperature information value and the friction-characteristics estimate value have not been set to the normal-temperature temperature-friction storage unit 12a (when determined as NO at Step S2), the temperature-friction automatic setting unit 16 sets the temperature information value and the friction-characteristics estimate value to the normal-temperature temperature-friction storage unit 12a (Step S3), returns to Step S1, and performs determination of Step S1 again. If the temperature information value and the friction-characteristics estimate value have been set to the normal-temperature temperature-friction storage unit 12a (when determined as YES at Step S2), the temperature-friction automatic setting unit 16 determines whether or not the temperature information value is higher than the temperature of the normal-temperature temperature-friction storage unit 12a (Step S4). If the temperature information value is higher than the temperature of the normal-temperature temperature-friction storage unit 12a (when determined as YES at Step S4), the temperature-friction automatic setting unit 16 determines whether or not the temperature information value and the friction-characteristics estimate value have been set to the high-temperature temperature-friction storage unit 13a (Step S5). If the temperature information value and the friction-characteristics estimate value have been set to the high-temperature temperature-friction storage unit 13a (when determined as YES at Step S5), the temperature-friction automatic setting unit 16 determines whether or not the temperature information value is higher than the temperature of the high-temperature temperature-friction storage unit 13a (Step S6), and if not (when determined as NO at Step S6), returns to Step S1, and performs determination of Step S1 again. If the temperature information value and the friction-characteristics estimate value have not been set to the high-temperature temperature-friction storage unit 13a (when determined as NO at Step S5), or if the temperature information value is higher than the temperature of the high-temperature temperature-friction storage unit 13a (when determined as YES at Step S6), the temperature-friction automatic setting unit 16 sets or updates the temperature information value and the friction-characteristics estimate value to the high-temperature temperature-friction storage unit 13a (Step S7), returns to Step S1, and performs determination of Step S1 again. If the temperature information value is not higher than the temperature of the normal-temperature temperature-friction storage unit 12a (when determined as NO at Step S4), the temperature-friction automatic setting unit 16 determines whether or not the temperature information value and the friction-characteristics estimate value have been set to the low-temperature temperature-friction storage unit 14a (Step S8). If the temperature information value and the friction-characteristics estimate value have been set to the low-temperature temperature-friction storage unit 14a (when determined as YES at Step S8), the temperature-friction automatic setting unit 16 determines whether or not the temperature information value is higher than the temperature of the low-temperature temperature-friction storage unit 14a (Step S9), and if yes (when determined as YES at Step S9), returns to Step S1, and performs determination of Step S1 again. If the temperature information value and the friction-characteristics estimate value have not been set to the low-temperature temperature-friction storage unit 14a (when determined as NO at Step S8), or if the temperature information value is not higher than the temperature of the low-temperature temperature-friction storage unit 14a (when determined as NO at Step S9), the temperature-friction automatic setting unit 16 sets or updates the temperature information value and the friction-characteristics estimate value to the low-temperature temperature-friction storage unit 14a (Step S10), returns to Step S1, and performs determination of Step S1 again.

The temperature-friction model generation unit 15 generates the temperature friction model based on the temperature information value and the friction-characteristics estimate value of the normal-temperature temperature-friction storage unit 12a, the high-temperature temperature-friction storage unit 13a and the low-temperature temperature-friction storage unit 14a, which have been set in the automatically setting period. At this time, the temperature friction model is generated so as to pass through the temperature information value and the friction-characteristics estimate value set to the normal-temperature temperature-friction storage unit 12a, taking into consideration the possibility that the drive mechanism 2 may have undergone variation with time during the automatically setting period. According to such a configuration, the temperature-friction automatic setting unit 16 automatically sets the temperature information value and the friction-characteristics estimate value to the normal-temperature temperature-friction storage unit 12a, the high-temperature temperature-friction storage unit 13a and the low-temperature temperature-friction storage unit 14a in the automatically setting period using a change of the external temperature due to a seasonal change.

As described above, in the motor control device according to the present embodiment, the temperature friction model is automatically generated based on the temperature information value and the friction-characteristics estimate value automatically set, and even under the installation environment in which the temperature changes, the friction variation value representing variation with time of the drive mechanism 2 can be calculated based on the estimated friction-characteristics estimate value.

In the present embodiment, the automatic setting-period measurement unit 17 has a configuration of setting and measuring the automatically setting period. However, the present invention is not limited thereto, and the automatic setting period measurement unit 17 may have a configuration in which the count number of the number of times of a power supply on/off or the number of operations is set, and an automatic setting request signal is outputted based on a measurement result of the count number.

Fourth Embodiment

Figure 9:
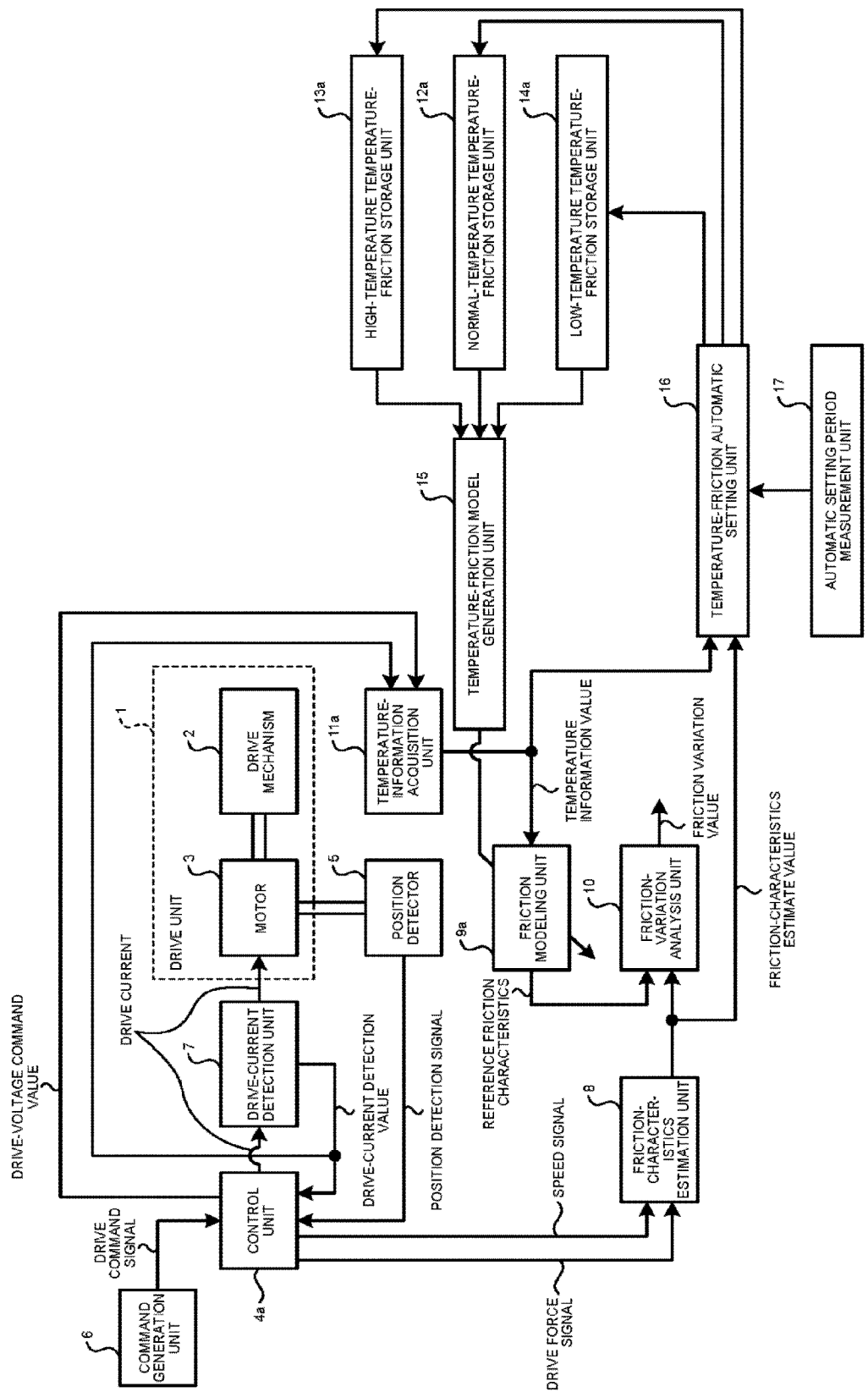
FIG. 9 is a block diagram illustrating a configuration of a motor control device according to a fourth embodiment.

FIG. 9 is a block diagram illustrating a configuration of a motor control device according to a fourth embodiment of the present invention. The motor control device according to the present embodiment has a configuration of including a control unit 4a that outputs also a drive-voltage command value, instead of the control unit 4 of FIG. 7, and a temperature-information acquisition unit 11a that estimates a temperature of the motor 3 based on the drive-current detection value and the drive-voltage command value, instead of the temperature-information acquisition unit 11. In the motor control device illustrated in FIG. 9, constituent elements identical to those illustrated in FIG. 7 operate and function in the same manner, and thus descriptions thereof are omitted here.

In the motor control device illustrated in FIG. 9, the control unit 4a supplies a drive current based on the position detection signal, the drive command signal and the drive-current detection value to the motor 3, and outputs the speed signal, the drive force signal and the drive-voltage command value. The motor 3 generates a drive force corresponding to the supplied drive current.

Figure 10:
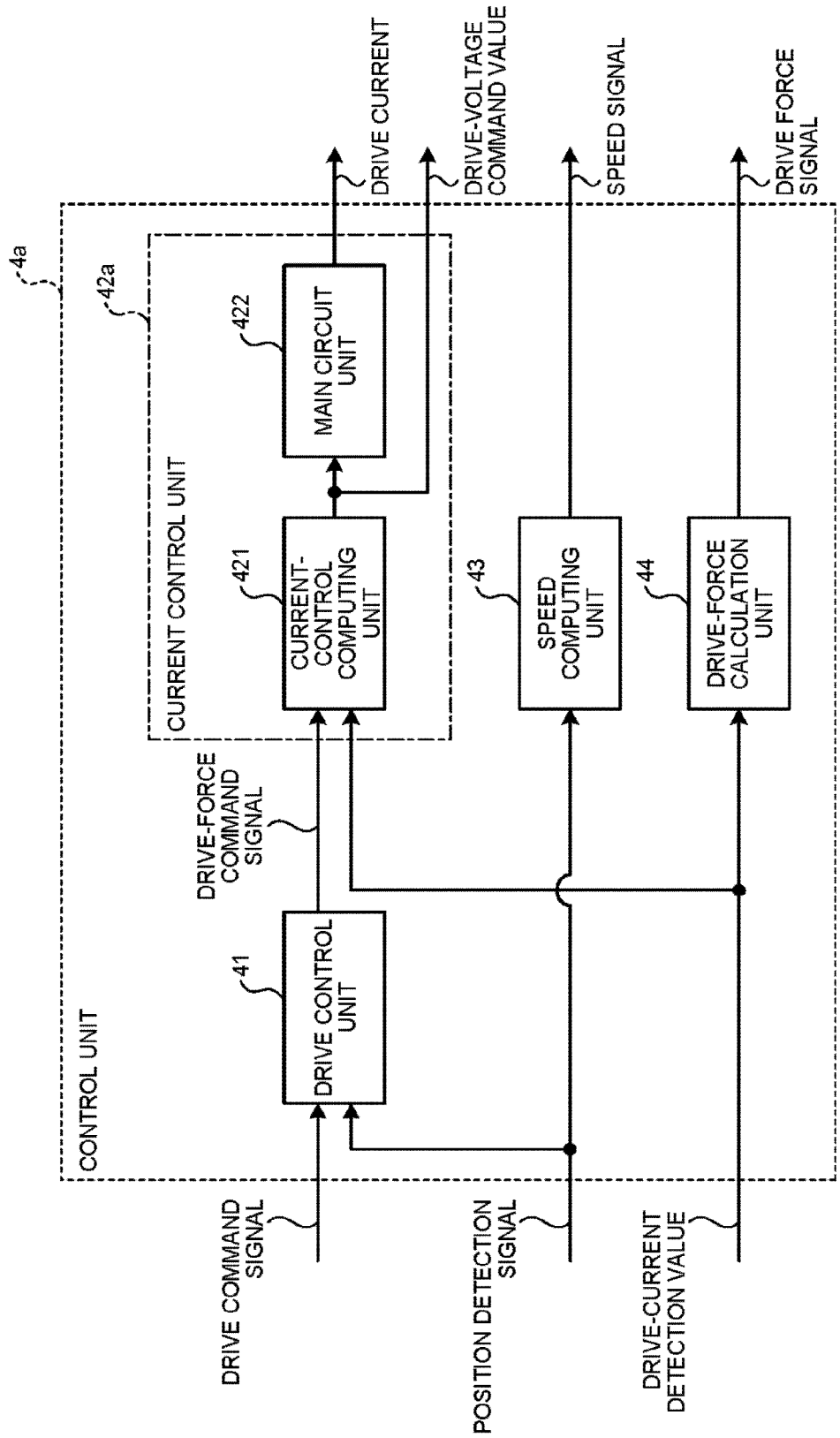
FIG. 10 is a block diagram illustrating a configuration of a control unit of the motor control device according to the fourth embodiment.

FIG. 10 is a block diagram illustrating a configuration of the control unit 4a. The control unit 4a illustrated in FIG. 10 includes the drive control unit 41, a current control unit 42a, the speed computing unit 43 and the drive-force calculation unit 44. That is, the control unit 4a illustrated in FIG. 10 has a configuration of including the current control unit 42a instead of the current control unit 42 of the control unit 4 illustrated in FIG. 2. The current control unit 42a includes a current-control computing unit 421 and a main circuit unit 422. The drive control unit 41, the speed computing unit 43 and the drive-force calculation unit 44 have been described with reference to FIG. 2 of the first embodiment, and thus descriptions thereof are omitted here.

The current-control computing unit 421 receives the drive-force command signal and the drive-current detection value as inputs, and outputs a drive-voltage command value so that the drive force generated by the motor 3 follows the drive-force command signal. The main circuit unit 422 outputs a drive current to the motor 3 according to the drive-voltage command value.

The temperature-information acquisition unit 11a measures a winding resistance of the motor 3 based on the drive-current detection value and the drive-voltage command value, and estimates the temperature of the motor 3 based on a relation between resistivity of a copper wire and temperature to output the temperature information value. Specifically, an estimate value of temperature is calculated based on the measured winding-resistance measurement value, a 20° C. winding resistance value that is a winding resistance value when the temperature of the winding is 20° C., which is a value measured beforehand, and a 20°-resistance temperature coefficient that is a resistance temperature coefficient at 20° C., using the following expression (4).

[Expression 4]

(Estimated temperature)=20+{(winding resistance measurement value)/(20° C.-winding resistance value)-1}/(20° C.-resistance temperature coefficient) (4)

According to the above expression (4), the temperature-information acquisition unit 11a estimates the temperature of the motor 3 and outputs the temperature information value.

As described above, in the motor control device according to the present embodiment, the temperature friction model is automatically set based on the temperature information value and the friction-characteristics estimate value automatically set, and it is possible to calculate the friction variation value representing variation with time of the drive mechanism 2 based on the estimated friction-characteristics estimate value, even under the installation environment in which the temperature changes.

In the motor control device according to the present embodiment, the temperature-information acquisition unit 11a estimates the temperature of the motor 3 using the drive-voltage command value outputted by the current control unit 42a. However, the temperature-information acquisition unit 11a may estimate the temperature of the motor 3 using a drive-voltage detection value, that is a detection value of the voltage applied to the main circuit unit 422 or the motor 3.

In the motor control device according to the present embodiment, as in the motor control device according to the second embodiment illustrated in FIG. 6, the temperature-friction automatic setting unit 16 and the automatic setting period measurement unit 17 may be omitted. In this case, it is sufficient to set the temperature information value and the friction-characteristics estimate value to the normal-temperature temperature-friction storage unit 12, the high-temperature temperature-friction storage unit 13 and the low-temperature temperature-friction storage unit 14.

In the motor control device according to the present embodiment, as in the motor control device according to the first embodiment illustrated in FIG. 1, the normal-temperature temperature-friction storage units 12 and 12a, the high-temperature temperature-friction storage units 13 and 13a, and the low-temperature temperature-friction storage units 14 and 14a, the temperature-friction model generation unit 15, the temperature-friction automatic setting unit 16, and the automatic setting period measurement unit 17 may be omitted. In this case, it is sufficient to set the temperature friction model to the friction modeling units 9 and 9a.

Fifth Embodiment

Figure 11:
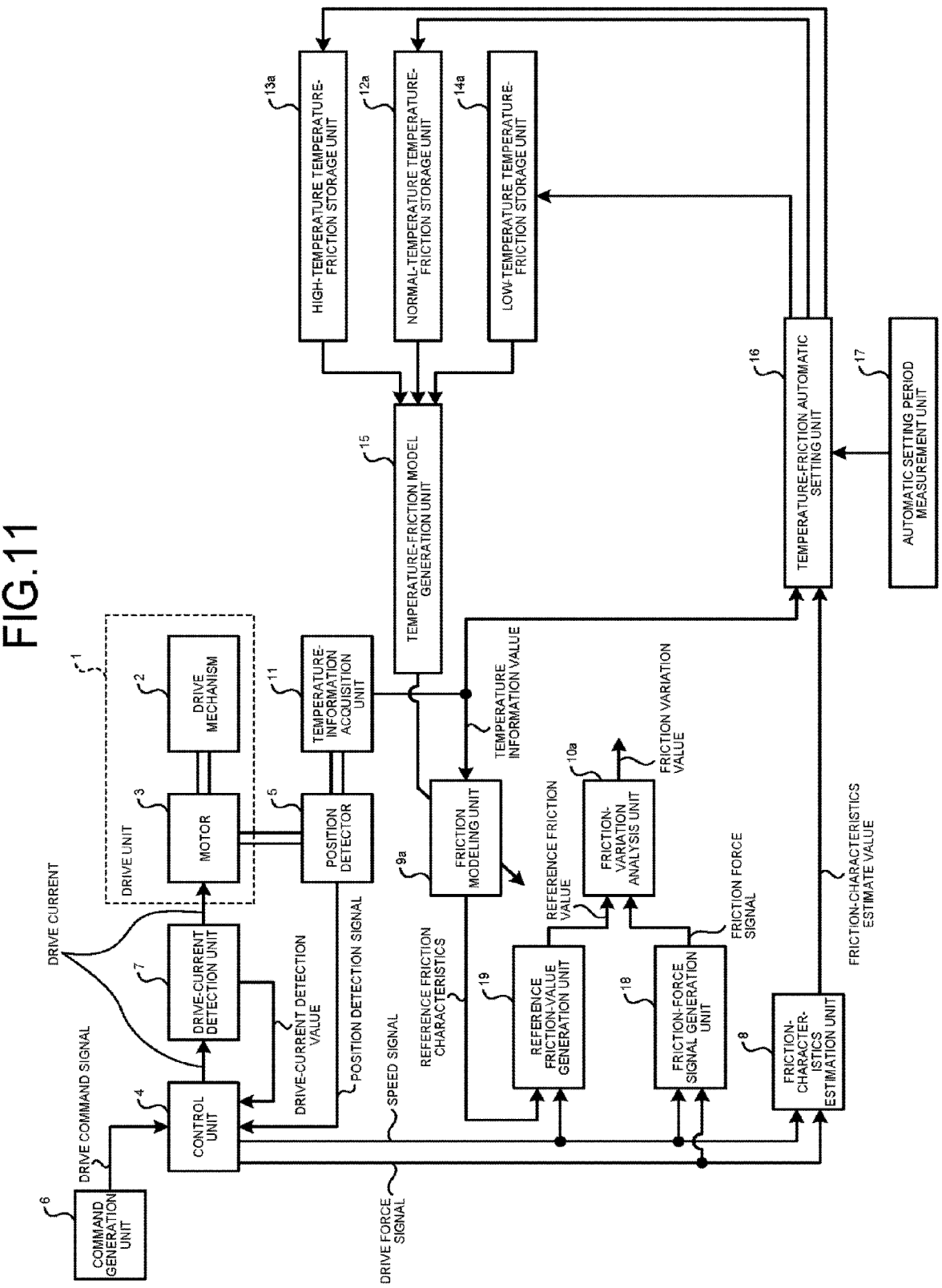
FIG. 11 is a block diagram illustrating a configuration of a motor control device according to a fifth embodiment.

FIG. 11 is a block diagram illustrating a configuration of a motor control device according to a fifth embodiment of the present invention. The motor control device according to the present embodiment includes a friction-force signal generation unit 18 and a reference friction-value generation unit 19 in addition to the configuration illustrated in FIG. 7, and also includes a friction-variation analysis unit 10a instead of the friction-variation analysis unit 10. The friction-force signal generation unit 18 calculates a friction force generated in the drive mechanism 2 based on the drive force signal and the speed signal to generate and output a friction force signal. The reference friction-value generation unit 19 generates and outputs a reference friction value based on the speed signal and the reference friction characteristics. The friction-variation analysis unit 10a compares the friction force signal with the reference friction value to calculate a friction variation value. In the motor control device illustrated in FIG. 11, constituent elements identical to those illustrated in FIG. 7 operate and function in the same manner, and thus descriptions thereof are omitted here.

The friction-force signal generation unit 18 calculates the friction force generated in the drive mechanism 2 by using a load mass applied to the motor 3, which has been stored beforehand, and an acceleration signal obtained by differentiating a speed signal that is an output from the control unit 4, to obtain a waveform of torque or thrust force required for acceleration and deceleration of the load mass, and subtracting the waveform from the drive force signal, thereby to generate and output a friction force signal. The reference friction-value generation unit 19 generates and outputs the reference friction value that is a friction value of the reference friction characteristics at the speed indicated by the speed signal, based on the reference friction characteristics that is an output from the friction modeling unit 9a and the speed signal that is an output from the control unit 4. The friction-variation analysis unit 10a has no input of the friction-characteristics estimate value, but receives, as inputs, the friction force signal that is an output from the friction-force signal generation unit 18 and the reference friction value that is an output from the reference friction-value generation unit 19. The friction-variation analysis unit 10a calculates the friction variation value representing friction variation of the drive mechanism 2 associated with variation with time, by performing the same computation as in the friction-variation analysis unit 10.

In this configuration, a friction force signal obtained by calculating the friction force generated in the drive mechanism 2 is used instead of the friction-characteristics estimate value estimated by the friction-characteristics estimation unit 8. A time is required for estimation of the friction-characteristics estimate value in the friction-characteristics estimation unit 8. However, the friction force signal can be generated instantly by performing an algebra calculation based on the drive force signal and the acceleration signal. Therefore, the friction variation value can be calculated in a short time.

As described above, the motor control device according to the present embodiment can calculate the friction variation value representing the variation with time of the drive mechanism 2 in a short time, even under the installation environment in which the temperature changes.

In the motor control device according to the present embodiment, as in the motor control device according to the second embodiment illustrated in FIG. 6, the temperature-friction automatic setting unit 16 and the automatic setting-period measurement unit 17 may be omitted. In this case, it is sufficient to set the temperature information value and the friction-characteristics estimate value to the normal-temperature temperature-friction storage unit 12, the high-temperature temperature-friction storage unit 13 and the low-temperature temperature-friction storage unit 14. Further, in the motor control device according to the present embodiment, as in the motor control device according to the first embodiment illustrated in FIG. 1, the normal-temperature temperature-friction storage units 12 and 12a, the high-temperature temperature-friction storage units 13 and 13a, the low-temperature temperature-friction storage units 14 and 14a, the temperature-friction model generation unit 15, the temperature-friction automatic setting unit 16, and the automatic setting period measurement unit 17 may be omitted. In this case, it is sufficient to set the temperature friction model to the friction modeling unit 9.

Sixth Embodiment

Figure 12:
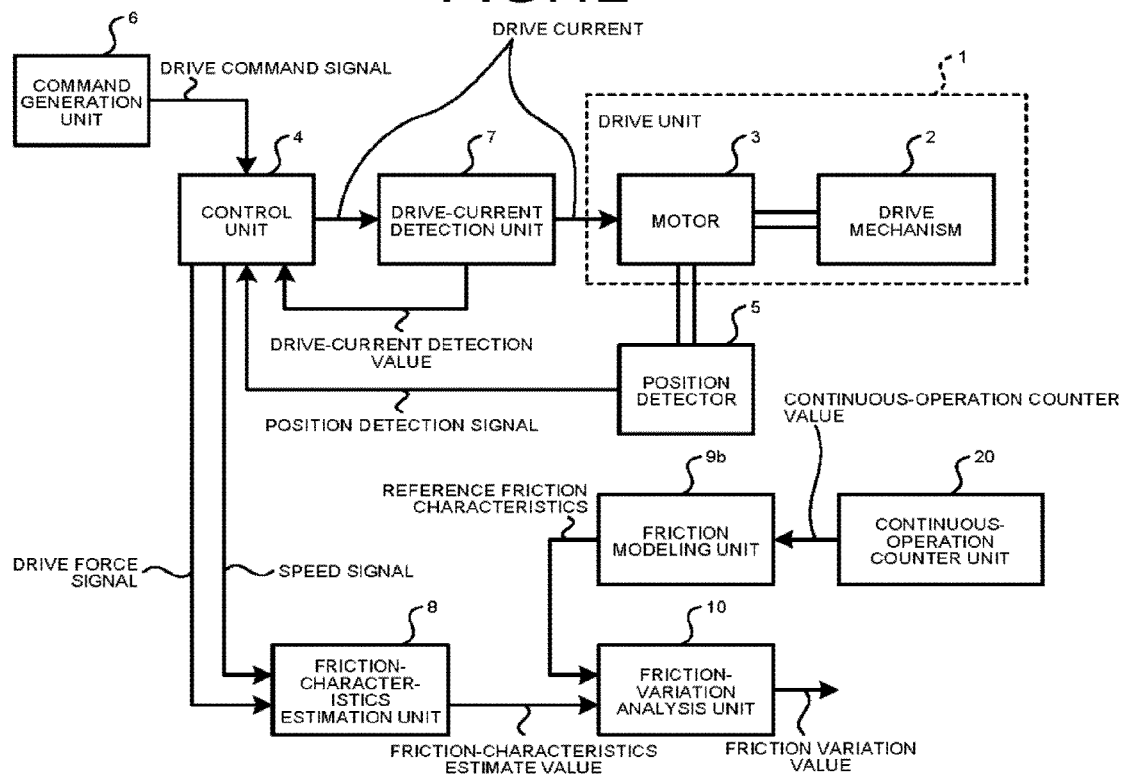
FIG. 12 is a block diagram illustrating a configuration of a motor control device according to a sixth embodiment.

FIG. 12 is a block diagram illustrating a configuration of a motor control device according to a sixth embodiment of the present invention. The motor control device according to the present embodiment includes a continuous-operation counter unit 20 instead of the temperature-information acquisition unit 11 of FIG. 1, and a friction modeling unit 9b instead of the friction modeling unit 9 of FIG. 1. The continuous-operation counter unit 20 generates and outputs a continuous-operation counter value that monotonously increases according to a continuous operation time. A continuous-operation friction model, whose friction characteristics change according to the continuous-operation counter value, is set to the friction modeling unit 9b. In the motor control device illustrated in FIG. 12, constituent elements identical to those illustrated in FIG. 1 operate and function in the same manner, and thus descriptions thereof are omitted here.

In the motor control device illustrated in FIG. 12, the drive unit 1 includes the drive mechanism 2 and the motor 3, and the motor 3 drives the drive mechanism 2 according to a drive command signal. The drive mechanism 2 includes a movable unit represented by a ball screw that converts a rotary movement to a linear movement or a guide mechanism that sets a moving direction, and friction is generated at the time of operation of the drive unit 1. The friction varies due to an influence of wear, flaw or foreign matters of the movable unit. Therefore, the friction characteristics become an index representing the state of the drive mechanism 2. Grease or lubricant is applied to the movable unit of the drive mechanism 2 for lubrication and friction reduction. The viscosity of the grease or lubricant changes according to the temperature, and as described in the first embodiment, the friction of the drive mechanism 2 has a temperature dependence. Because the temperature of the drive mechanism 2 increases because of a loss due to friction and an electrical loss of the motor 3 during a continuous operation of the drive unit 1, the friction characteristics of the drive mechanism 2 change due to the continuous operation.

Figure 13:
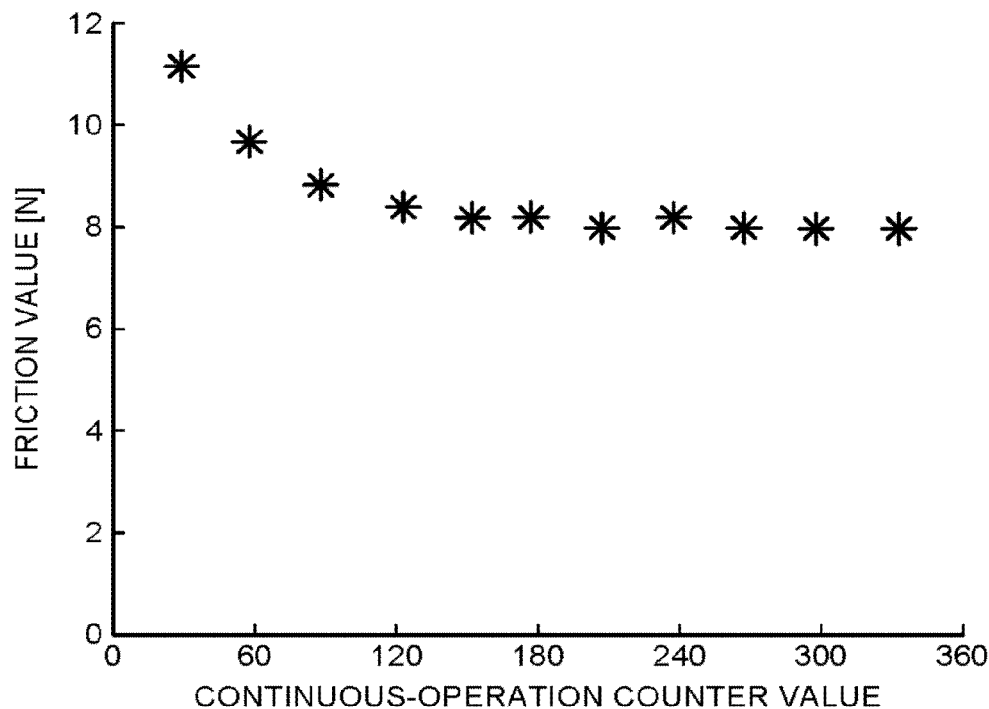
FIG. 13 is a graph illustrating variation of a friction value when a drive mechanism configured by a ball screw is driven by a motor at a normal time, in the motor control device according to the sixth embodiment.

FIG. 13 is a graph illustrating a change of the friction value when the drive mechanism 2 configured by a ball screw is driven by the motor 3, as an example, at the time of introduction of the mechanical device, at a normal time. Here, a continuous-operation counter value is plotted on a horizontal axis and a friction value (N) when the motor 3 is rotated at a revolution speed of 3000 rpm is plotted on a vertical axis. The continuous-operation counter value is represented in minutes. However, the present invention is not limited thereto, and the continuous-operation counter value may be expressed in certain unit times. As illustrated in FIG. 13, the friction value decreases continuously in a period from the start of a continuous operation to 120 minutes, and thereafter, hardly changes and generally takes a constant value. It is contemplated that the reason why the friction value varies in this manner is that the friction characteristics change due to a temperature rise of the drive mechanism 2 caused by a frictional loss or an electrical loss in the period from the start of the continuous operation to 120 minutes, and thereafter the external temperature and heat generation due to the losses reach a condition of equilibrium, thereby the temperature not changing.

Now, description is given for a case where variation with time is ascertained based on the friction variation using a friction value of 8.2N as a reference after 300 minutes have passed since the start of the continuous operation. After 60 minutes have passed since the start of the continuous operation, the estimated friction value is 9.7N. Therefore, it means that the friction value has varied by 1.5N. The variation amount of the friction value is 18% in percentage. Therefore, if the friction characteristics change during the continuous operation is not taken into consideration, it may be erroneously determined that the friction variation of 18% is caused by the variation with time. For that reason, the friction characteristics change during the continuous operation should be taken into consideration for extraction of the variation of friction characteristics caused by the variation with time of the drive mechanism 2 from the friction variation. It is considered here that heat generation due to the frictional loss or electrical loss does not change if the operation pattern of the drive unit 1 is the same. Therefore, at the normal time, a continuous-operation friction model in which a relation between the continuous-operation counter value and the friction characteristics is modeled is generated based on the continuous-operation counter value that is an output from the continuous-operation counter unit 20 and the friction-characteristics estimate value estimated and outputted by the friction-characteristics estimation unit 8 when the drive mechanism 2 at the time of introduction of the mechanical device is operated with repetition of a certain operation pattern as an example. In this way, as long as the operation pattern of the drive unit 1 is the same, the variation with time of the drive mechanism 2 can be ascertained using the continuous-operation friction model as a reference. That is, the friction modeling unit 9b can ascertain the variation with time of the drive mechanism 2 taking the change of the friction characteristics during the continuous operation into consideration, by calculating the reference friction characteristics according to the continuous-operation counter value from the continuous-operation friction model, and comparing the reference friction characteristics with the friction-characteristics estimate value estimated by the friction-characteristics estimation unit 8 to perform analysis.

The continuous-operation friction model is set according to the following expressions (5) and (6), in which is suitable to be expressed by functions of the viscosity coefficient and the Coulomb coefficient with respect to the continuous-operation counter value, according to the friction-characteristics estimate value estimated by the friction-characteristics estimation unit 8.

[Expression 5]

(Viscosity coefficient)=(viscosity temperature coefficient)×(continuous-operation counter value)+ (viscosity offset value)    (5)

[Expression 6]

(Coulomb coefficient)=(Coulomb temperature coefficient)×(continuous-operation counter value)+ (Coulomb offset value)    (6)

The friction modeling unit 9b at this time outputs the viscosity coefficient and the Coulomb coefficient to be references from the expressions (5) and (6) described above as reference friction characteristics, in accordance with the input continuous-operation counter value.

The friction-variation analysis unit 10 calculates the friction variation value representing the friction variation of the drive mechanism 2 associated with variation with time as described above, based on the reference friction characteristics and the friction-characteristics estimate value.

In this configuration, a continuous-operation friction model in which the friction characteristics change according to the continuous-operation counter value is set to the friction modeling unit 9b, at the normal time, based on a relation between the friction and the continuous operation time when a certain operation pattern is repeated in the drive mechanism 2 at the time of introduction of the mechanical device as an example. Then, the friction modeling unit 9b calculates and outputs the reference friction characteristics according to the continuous-operation counter value generated by the continuous-operation counter unit 20 at the time of estimation of the friction-characteristics estimate value. The friction-variation analysis unit 10 compares the friction-characteristics estimate value estimated by the friction-characteristics estimation unit 8 with the reference friction characteristics, and outputs a friction variation value obtained with taking the relation between the continuous operation time and the friction characteristics into consideration.

As described above, the motor control device according to the present embodiment can calculate the friction variation value representing variation with time of the drive mechanism 2 based on the estimated friction-characteristics estimate value, even in the drive mechanism 2 in which the friction characteristics change, by a continuous operation in which a certain operation pattern is repeated. In the motor control device according to the present embodiment, the continuous-operation counter unit 20 generates a continuous-operation counter value that monotonously increases according to the continuous operation time. However, the continuous-operation counter unit 20 may generate a continuous-operation counter value based on a phenomenon in which the number of times of the operation pattern, that is, the number of times of operations monotonously increases due to repetition of a determined operation pattern, such as the number of repetitions of an operation pattern or the number of times of acceleration and deceleration.

Seventh Embodiment

Figure 14:
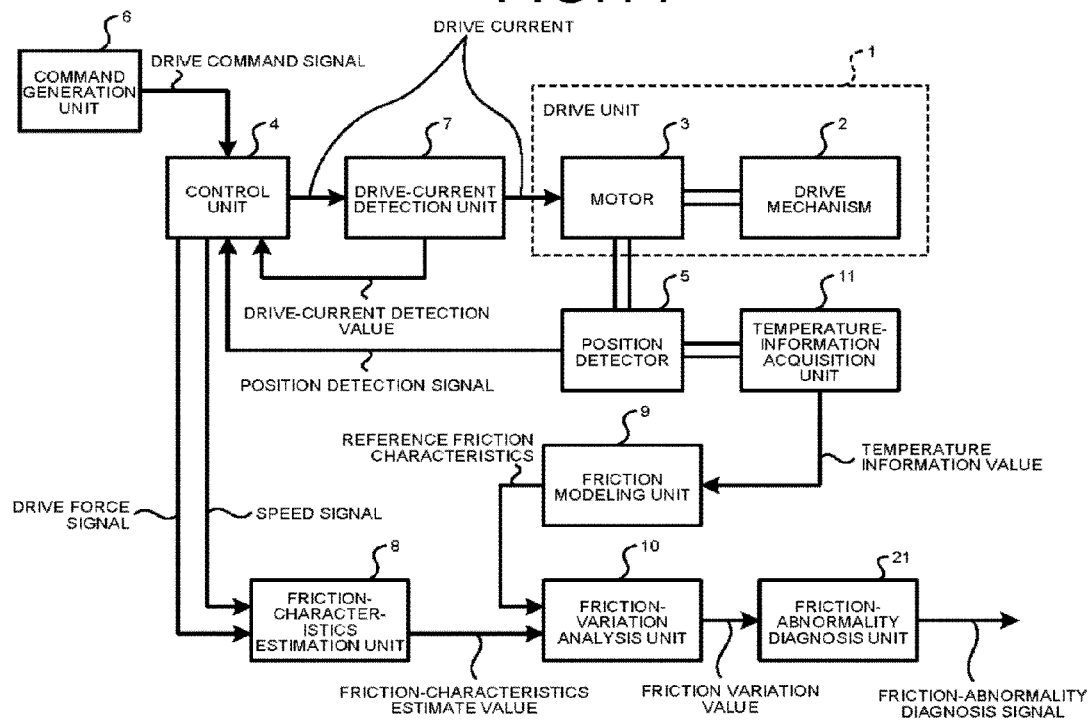
FIG. 14 is a block diagram illustrating a configuration of a motor control device according to a seventh embodiment.

FIG. 14 is a block diagram illustrating a configuration of a motor control device according to a seventh embodiment of the present invention. The motor control device according to the present embodiment has a configuration in which a friction-abnormality diagnosis unit 21 is added to the motor control device illustrated in FIG. 1. The friction-abnormality diagnosis unit 21 receives a friction variation value outputted by the friction-variation analysis unit 10 as an input thereof, and outputs a friction-abnormality diagnosis signal. In the motor control device illustrated in FIG. 14, constituent elements identical to those illustrated in FIG. 1 operate and function in the same manner, and thus descriptions thereof are omitted here.

In the motor control device illustrated in FIG. 14, the friction-abnormality diagnosis unit 21 compares the input friction variation value with a preset normal value range of the friction variation value, and if the friction variation value is out of the normal value range, outputs a friction-abnormality diagnosis signal indicating friction abnormality. If the input friction variation value is within the normal value range, the friction-abnormality diagnosis unit 21 outputs a friction-abnormality diagnosis signal indicating that the friction is normal, or does not output any signal.

As illustrated in the first embodiment and FIG. 5, the friction-variation analysis unit 10 compares the reference friction characteristics calculated by the friction modeling unit 9 with a friction-characteristics estimate value of the drive mechanism 2 estimated by the friction-characteristics estimation unit 8, to calculate a friction variation value representing the friction variation of the drive mechanism 2. The reference friction characteristics calculated by the friction modeling unit 9 are friction characteristics of the drive mechanism 2 at the normal time, which corresponds to the temperature information value acquired by the temperature-information acquisition unit 11. Accordingly, the friction-variation analysis unit 10 compares the friction-characteristics estimate value with the reference friction characteristics to calculate a variation amount of the current friction characteristics with respect to the friction characteristics at the normal time at the current temperature, and calculates a percentage of the variation amount with respect to the reference friction characteristics to output the friction variation value. In this manner, because the friction variation value is calculated with taking the temperature dependence of friction into consideration, the friction variation value is supposed to represent variation of the friction characteristics due to variation with time regardless of the temperature.

The friction-abnormality diagnosis unit 21 compares the friction variation value representing the variation of the friction characteristics due to variation with time with the preset normal value range, to diagnose whether the friction of the drive mechanism 2 is normal or abnormal. Because the friction variation value does not depend on the temperature, diagnosis using one normal value range is possible regardless of the temperature.

As described above, the motor control device according to the present embodiment can notify a user of the presence or absence of friction abnormality in the drive mechanism 2 based on the friction-abnormality diagnosis signal outputted by the friction-abnormality diagnosis unit 21. In the present embodiment, the description has been made for a mode in which the friction-abnormality diagnosis unit 21 is added to the configuration in FIG. 1 of the first embodiment, but even if the friction-abnormality diagnosis unit 21 is added to the configuration in FIG. 6 of the second embodiment, the configuration in FIG. 7 of the third embodiment, the configuration in FIG. 9 of the fourth embodiment, the configuration in FIG. 11 of the fifth embodiment, or the configuration in FIG. 12 of the sixth embodiment, identical effects can be exerted.

Eighth Embodiment

Figure 15:
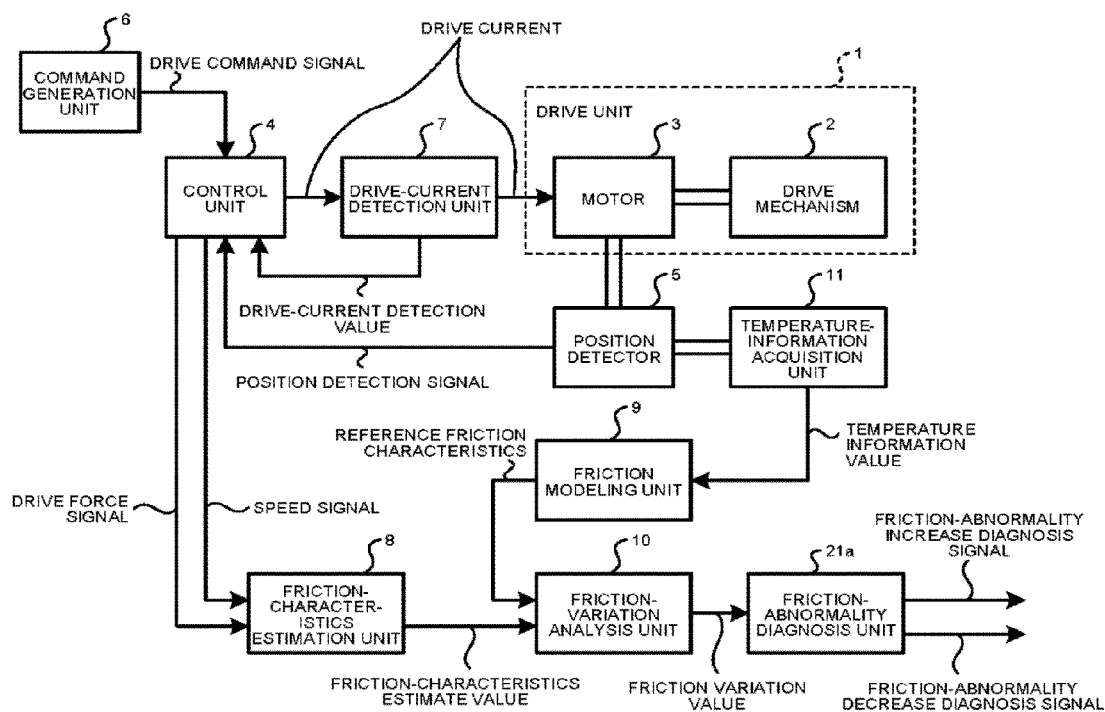
FIG. 15 is a block diagram illustrating a configuration of a motor control device according to an eighth embodiment.

FIG. 15 is a block diagram illustrating a configuration of a motor control device according to an eighth embodiment of the present invention. The motor control device according to the present embodiment includes a friction-abnormality diagnosis unit 21*a* instead of the friction-abnormality diagnosis unit 21 illustrated in FIG. 14 of the seventh embodiment.

The friction-abnormality diagnosis unit 21*a* outputs a friction-abnormality increase diagnosis signal or a friction-abnormality decrease diagnosis signal based on the friction variation value outputted by the friction-variation analysis unit 10. In the motor control device illustrated in FIG. 15, constituent elements identical to those illustrated in FIG. 1 operate and function in the same manner, and thus descriptions thereof are omitted here.

In the motor control device illustrated in FIG. 15, a normal value range of the friction variation value having an upper limit and a lower limit is preset to the friction-abnormality diagnosis unit 21*a*. The friction-abnormality diagnosis unit 21*a* compares the input friction variation value with the normal value range, and if the friction variation value exceeds the upper limit of the normal value range, outputs a friction-abnormality increase diagnosis signal indicating an abnormal increase of friction. On the other hand, if the friction variation value falls below the lower limit of the normal value range, the friction-abnormality diagnosis unit 21*a* outputs a friction-abnormality decrease diagnosis signal indicating an abnormal decrease of friction. When the friction variation value is within the normal value range, the friction-abnormality diagnosis unit 21*a* outputs a friction-abnormality increase diagnosis signal indicating that the friction is normal, or a friction-abnormality decrease diagnosis signal indicating that the friction is normal, or does not output any signal.

The friction generated by the drive mechanism 2 is caused by lubricant oil or grease as a lubricant agent, or by pressurization of a bearing, ball screw or linear guide used in the drive mechanism 2. An increase of friction is expected if viscosity of the lubricant oil increases or hardening of the grease occurs due to variation with time, or foreign matters are mixed therein. On the other hand, a decrease of friction is expected if viscosity of the lubricant oil decreases or softening of the grease occurs, or pressurization decreases. The friction-abnormality diagnosis unit 21*a* distinguishes between abnormal increase and abnormal decrease of friction to output the friction-abnormality increase diagnosis signal or the friction-abnormality decrease diagnosis signal, and thus can perform diagnosis distinguishing the above phenomena.

As described above, according to the present embodiment, if the friction variation value exceeds the upper limit of the normal value range, the friction-abnormality increase diagnosis signal indicating an abnormal increase of friction is outputted, and if the friction variation value falls below the lower limit of the normal value range, the friction-abnormality decrease diagnosis signal indicating an abnormal decrease of friction is outputted. It is considered that in the drive mechanism 2, a phenomenon occurring when the friction increases and a phenomenon occurring when the friction decreases are different from each other. Therefore, a user can take different measures at the time of abnormal increase of friction and at the time of abnormal decrease of friction, respectively. In the present embodiment, the description has been made for a mode in which the friction-abnormality diagnosis unit 21 of the configuration of the seventh embodiment is replaced with the friction-abnormality diagnosis unit 21*a*, that is, a mode in which the friction-abnormality diagnosis unit 21 is added to the configuration in FIG. 1 of the first embodiment, but even if the friction-abnormality diagnosis unit 21*a* is added to the configuration in FIG. 6 of the second embodiment, the configuration in FIG. 7 of the third embodiment, the configuration in FIG. 9 of the fourth embodiment, the configuration in FIG. 11 of the fifth embodiment, or the configuration in FIG. 12 of the sixth embodiment, identical effects can be exerted.

Ninth Embodiment

Figure 16:
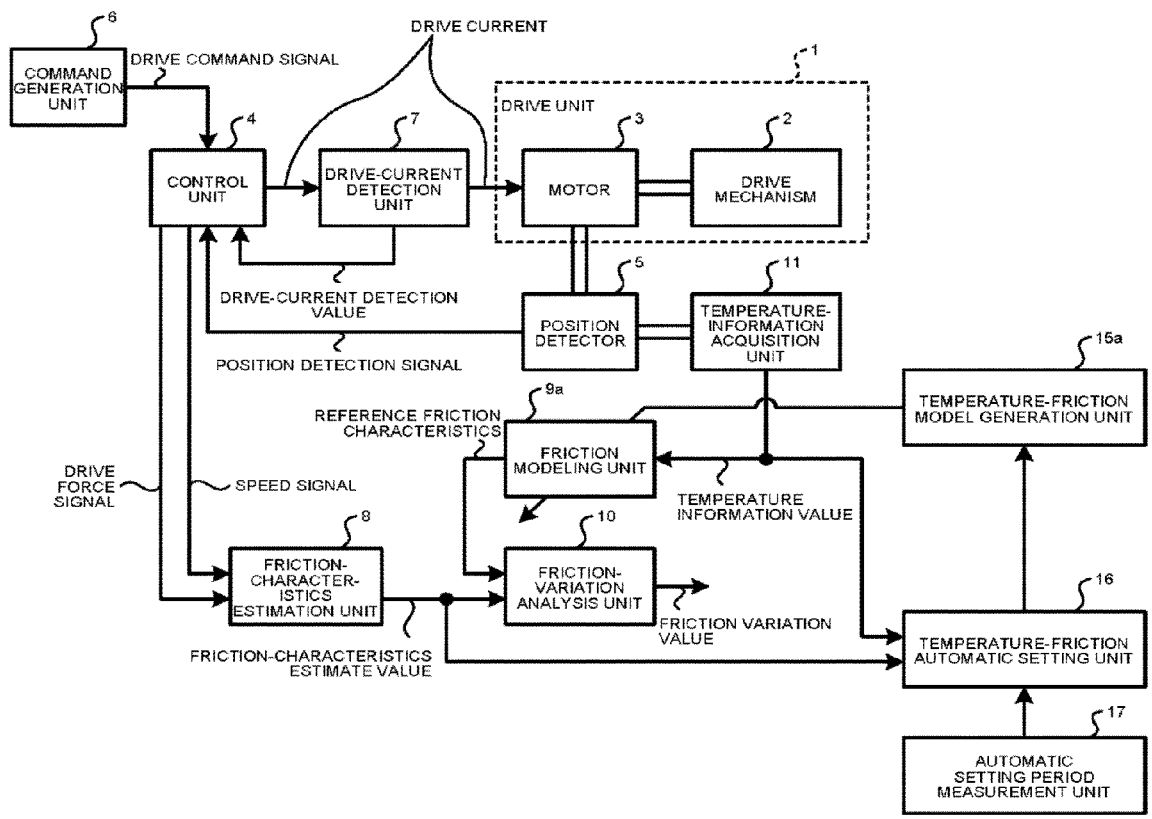
FIG. 16 is a block diagram illustrating a configuration of a motor control device according to a ninth embodiment.

FIG. 16 is a block diagram illustrating a configuration of a motor control device according to a ninth embodiment of the present invention. The motor control device according to the present embodiment has a configuration in which the normal-temperature temperature-friction storage unit 12*a*, the high-temperature temperature-friction storage unit 13*a* and the low-temperature temperature-friction storage unit 14*a* are omitted from the configuration illustrated in FIG. 7 of the third embodiment, and a temperature-friction model generation unit 15*a* is provided instead of the temperature-friction model generation unit 15.

The temperature information value and the friction-characteristics estimate value are set to the temperature-friction model generation unit 15*a* by the temperature-friction automatic setting unit 16 in a period set by the automatic setting period measurement unit 17. In the motor control device illustrated in FIG. 16, constituent elements identical to those illustrated in FIG. 7 operate and function in the same manner, and thus descriptions thereof are omitted here.

In the motor control device illustrated in FIG. 16, the temperature-friction automatic setting unit 16 sets the temperature information value and the friction-characteristics estimate value automatically to the temperature-friction model generation unit 15*a* in the period set by the automatic setting period measurement unit 17. If the period set by the automatic setting period measurement unit 17 becomes a long period such as a year or more, the drive mechanism 2 has a risk of undergoing variation with time during the period. Therefore, the automatically setting period is preferably a period from about three months to six months, which is a period in which it is supposed that the variation with time hardly occurs.

The temperature-friction model generation unit 15*a* generates a temperature friction model based on the temperature information value and the friction-characteristics estimate value set by the temperature-friction automatic setting unit 16. For example, the temperature-friction model generation unit 15a generates a temperature friction model based on the temperature information value and the friction-characteristics estimate value inputted in the automatically setting period using an iterative least squares technique.

As described above, in the motor control device according to the present embodiment, the temperature friction model is automatically generated based on the temperature information value and the friction-characteristics estimate value automatically set, and the friction variation value representing variation with time of the drive mechanism 2 can be calculated based on the estimated friction-characteristics estimate value. Further, the configuration of the present embodiment does not require the normal-temperature temperature-friction storage unit 12a, the high-temperature temperature-friction storage unit 13a and the low-temperature temperature-friction storage unit 14a, which are required in the configuration illustrated in FIG. 7 of the third embodiment. Therefore, an amount of memory required for the automatic generation of the temperature friction model can be reduced. In this manner, the reference friction model can be calculated from the temperature information value and the friction-characteristics estimate value, and set to the friction modeling unit.

In the present embodiment, the temperature-friction model generation unit 15a generates the temperature friction model based on the temperature information value and the friction-characteristics estimate value using, for example, an iterative least squares technique, but the present invention is not limited thereto. If the drive unit is used under an environment where air conditioning is controlled and temperature change hardly occurs, the temperature friction model may be generated by averaging the temperature information values and the friction-characteristics estimate values, respectively. In this case, the temperature friction model does not have a temperature dependence. Therefore, the friction modeling unit 9a outputs constant reference friction characteristics regardless of the temperature information value. Further, in this case, the automatically setting period is preferably shorter than six months that are a period in which it is supposed that variation with time of the drive mechanism 2 hardly occurs.

As described in the first to ninth embodiments, according to the motor control device of the present invention, abnormality can be recognized at an early stage. Therefore, an overload on other components due to the abnormality can be prevented, a long life can be achieved, energy consumption due to the abnormality can be suppressed, and a load on the environment can be also reduced. Further, when the motor control device is applied to a production machine, the yield can be improved. When the motor control device is applied to a transport machine, the abnormality can be handled at an early stage, thereby enabling to improve the transport efficiency.

INDUSTRIAL APPLICABILITY

As described above, the motor control device according to the present invention is useful for a mechanical device having a drive unit driven by a motor, which is represented by an automated machine, a machine tool, or a robot. Particularly, the motor control device according to the present invention is suitable for a mechanical device having a drive mechanism whose friction characteristics change due to a temperature change of an installation environment or a continuous operation time.

The configurations of the embodiments described above are only examples of the contents of the present invention. The configurations can be combined with other publicly-known techniques, and can be partially omitted or modified without departing from the scope of the invention.

REFERENCE SIGNS LIST 1 drive unit, 2 drive mechanism, 3 motor, 4, 4a control unit, 5 position detector, 6 command generation unit, 7 drive-current detection unit, 8 friction-characteristics estimation unit, 9, 9a, 9b friction modeling unit, 10, 10a friction-variation analysis unit, 11, 11a temperature-information acquisition unit, 12, 12a normal-temperature temperature-friction storage unit, 13, 13a high-temperature temperature-friction storage unit, 14, 14a low-temperature temperature-friction storage unit, 15, 15a temperature-friction model generation unit, 16 temperature-friction automatic setting unit, 17 automatic setting period measurement unit, 18 friction-force signal generation unit, 19 reference friction-value generation unit, 20 continuous-operation counter unit, 21, 21a friction-abnormality diagnosis unit, 41 drive control unit, 42, 42a current control unit, 43 speed computing unit, 44 drive-force calculation unit, 101 subtractor, 102 variation-amount-percentage calculation unit, 421 current-control computing unit, 422 main circuit unit.

The invention claimed is:

1. A motor control device comprising:
a command generation unit that outputs a drive command signal as a command to a drive unit including a drive mechanism driven by a motor;
a movement detection unit that detects a position or speed of the drive unit and outputs a movement detection signal;
a drive-current detection unit that detects a drive current supplied to the motor and outputs a drive-current detection value;
a control unit that receives the drive command signal and the movement detection signal as inputs to generate a drive-force command signal, and supplies the drive current according to the drive-force command signal and the drive-current detection value;
a friction-characteristics estimation unit that receives a drive force signal representing a drive force of the motor and the movement detection signal as inputs to output a friction-characteristics estimate value;
a temperature-information acquisition unit that acquires a temperature of the drive unit or a temperature of a part whose temperature changes according to the temperature of the drive unit and outputs a temperature information value;
a friction modeling unit in which a reference friction model whose characteristics change according to the temperature of the drive unit or the temperature of the part whose temperature changes according to the temperature of the drive unit is set, which outputs reference friction characteristics based on the temperature information value; and
a friction-variation analysis unit that outputs a friction variation value based on variation of the friction-characteristics estimate value with respect to the reference friction characteristics.

2. The motor control device according to claim 1, wherein the friction-variation analysis unit outputs a friction variation value that represents a variation amount of the friction-characteristics estimate value with respect to the reference friction characteristics in percentage.

3. The motor control device according to claim 1, comprising a temperature-friction model generation unit that calculates the reference friction model based on the temperature information value and the friction-characteristics estimate value and sets the reference friction model to the friction modeling unit.

4. The motor control device according to claim 1, wherein the temperature-information acquisition unit is attached to the movement detection unit.

5. The motor control device according to claim 1, wherein the temperature-information acquisition unit is attached to the drive unit.

6. The motor control device according to claim 1, wherein the control unit includes a current control unit,
the current control unit generates a drive-voltage command value based on the drive-force command signal and the drive-current detection value, and supplies the drive current calculated using the drive-voltage command value to the motor, and
the temperature-information acquisition unit estimates and outputs a temperature of the motor based on the drive-voltage command value and the drive-current detection value without acquiring a temperature of the drive unit or a temperature of a part whose temperature changes according to the temperature of the drive unit.

7. The motor control device according to claim 1, comprising:
a friction-force signal generation unit that outputs a friction force signal based on the drive force signal and the movement detection signal; and
a reference friction-value generation unit that outputs a reference friction value based on the reference friction characteristics and the movement detection signal, wherein
the friction-variation analysis unit outputs the friction variation value based on a variation amount of a friction force signal with respect to the reference friction value, instead of the reference friction characteristics.

8. The motor control device according to claim 1, comprising:
a plurality of temperature-friction storage units that store a temperature value and friction characteristics at a specified temperature; and
a temperature-friction model generation unit that calculates a reference friction model whose friction characteristics change according to a temperature change, by an approximate calculation based on the friction characteristics at a plurality of temperature values stored in the temperature-friction storage units, and sets the reference friction model to the friction modeling unit.

9. The motor control device according to claim 8, comprising a temperature-friction automatic setting unit that automatically sets the plurality of temperature-friction storage units based on the temperature information value and the friction-characteristics estimate value in a set period.

10. The motor control device according to claim 8, wherein the temperature-friction model generation unit calculates a reference friction model that passes through a point expressed by a temperature value and friction characteristics stored in at least one of the temperature-friction storage units, by an approximate calculation.

11. The motor control device according to claim 1, comprising a friction-abnormality diagnosis unit, wherein
the friction-abnormality diagnosis unit compares the friction variation value with a preset normal value range, to determine whether the friction variation value is normal or abnormal, and outputs a friction-abnormality diagnosis signal.

12. The motor control device according to claim 1, comprising a friction-abnormality diagnosis unit, wherein
the friction-abnormality diagnosis unit, in which a normal value range defined by an upper limit and a lower limit is set, compares the friction variation value with the normal value range, and when the friction variation value exceeds the upper limit, outputs a friction-abnormality increase diagnosis signal, and when the friction variation value falls below the lower limit, outputs a friction-abnormality decrease diagnosis signal.

13. A motor control device comprising:
a command generation unit that outputs a drive command signal as a command to a drive unit including a drive mechanism driven by a motor;
a movement detection unit that detects a position or speed of the drive unit and outputs a movement detection signal;
a drive-current detection unit that detects a drive current supplied to the motor and outputs a drive-current detection value;
a control unit that receive the drive command signal and the movement detection signal as inputs to generate a drive-force command signal, and supplies the drive current according to the drive-force command signal and the drive-current detection value;
a friction-characteristics estimation unit that receives a drive force signal representing a drive force of the motor and the movement detection signal as inputs to output a friction-characteristics estimate value;
a continuous-operation counter unit that outputs a continuous-operation counter value that monotonously increases at a time of a continuous operation;
a reference friction modeling unit in which a reference friction model whose characteristics change according to the continuous-operation counter value is set, which outputs reference friction characteristics based on the continuous-operation counter value; and
a friction-variation analysis unit that outputs a friction variation value based on variation of the friction-characteristics estimate value with respect to the reference friction characteristics.

14. The motor control device according to claim 13, wherein the continuous-operation counter unit outputs a continuous-operation counter value that monotonously increases from start of a continuous operation in response to each passage of a unit time.

15. The motor control device according to claim 13, wherein the continuous-operation counter unit outputs a continuous-operation counter value that monotonously increases in response to a certain number of times of operations from start of a continuous operation.

* * * * *